(12) United States Patent
Zhang et al.

(10) Patent No.: US 10,645,383 B2
(45) Date of Patent: May 5, 2020

(54) CONSTRAINED DIRECTIONAL ENHANCEMENT FILTER SELECTION FOR VIDEO CODING

(71) Applicant: Intel Corporation, Santa Clara, CA (US)

(72) Inventors: Ximin Zhang, San Jose, CA (US); Sang-hee Lee, San Jose, CA (US); Zhijun Lei, Portland, OR (US); Dmitry Ryzhov, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 15/994,017

(22) Filed: May 31, 2018

(65) Prior Publication Data

US 2019/0045186 A1    Feb. 7, 2019

(51) Int. Cl.
*H04N 19/117* (2014.01)
*H04N 19/172* (2014.01)
*H04N 19/86* (2014.01)
*H04N 19/124* (2014.01)
*H04N 19/176* (2014.01)
*H04N 19/157* (2014.01)
*H04N 19/82* (2014.01)

(52) U.S. Cl.
CPC ......... *H04N 19/117* (2014.11); *H04N 19/124* (2014.11); *H04N 19/157* (2014.11); *H04N 19/172* (2014.11); *H04N 19/176* (2014.11); *H04N 19/82* (2014.11); *H04N 19/86* (2014.11)

(58) Field of Classification Search
None
See application file for complete search history.

(56) References Cited

U.S. PATENT DOCUMENTS

2017/0013260 A1* 1/2017 Valin ................... H04N 19/136

* cited by examiner

*Primary Examiner* — Dakshesh D Parikh
(74) *Attorney, Agent, or Firm* — Green, Howard & Mughal LLP

(57) ABSTRACT

Techniques related to selecting constrained directional enhancement filters for video coding are discussed. Such techniques may include selecting subset of constrained directional enhancement filters for use by a frame based on a frame level quantization parameter of the frame such that only the subset is used for filtering the frame.

25 Claims, 10 Drawing Sheets

CONSTRAINED DIRECTIONAL ENHANCEMENT FILTER SELECTION FOR VIDEO CODING

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In loop filtering including deblock filtering and other enhancement filtering is an important feature in modern video coding standards. Such filtering improves both objective and subjective video quality and compression efficiency. In the standards, parameters are defined to regulate such filtering operations. However, in implementation, parameter selection techniques may be left undefined.

It may be advantageous to improve in loop filter selection to provide improved compression efficiency and/or video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 illustrates example pixel values of a pixel to be filtered and neighboring pixels;

FIG. 6 illustrates example filter taps of an example constrained directional enhancement filter (CDEF) combination;

DETAILED DESCRIPTION

Figure 1:
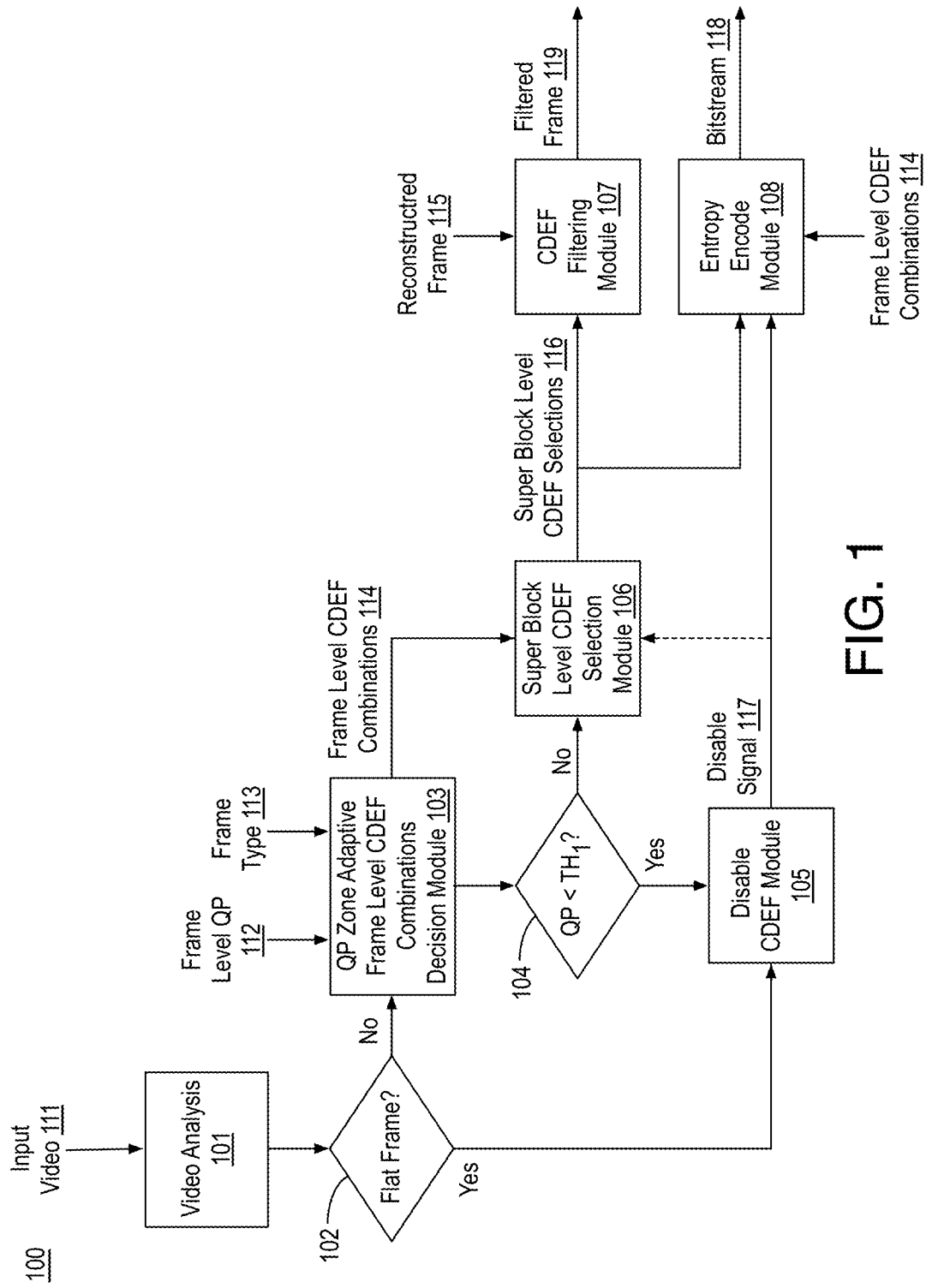
FIG. 1 is an illustrative diagram of an example system for video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to adaptive constrained directional enhancement filter selection.

As described above, in modern video coding standards, in loop filtering is an important feature that can provide improved efficiency and/or video quality. As discussed herein, techniques include receiving a frame of video for coding and a frame level quantization parameter (QP) corresponding to the frame and determining a subset of constrained directional enhancement filter combinations for the frame using the frame level quantization parameter such that the subset is from any number of available constrained directional enhancement filter combinations. Each of the constrained directional enhancement filter combinations indicates a deringing filter strength and a low-pass filter strength for the corresponding constrained directional enhancement filter combination. Only the subset of constrained directional enhancement filter combinations is then available for filtering the frame. Other constrained directional enhancement filter combinations from the available constrained directional enhancement filter combinations are not available for filtering the frame. The filtering may then progress by selecting a particular constrained directional enhancement filter combination for each super block of the frame from only the selected subset and filtering each block of the frame using only the particular constrained directional enhancement filter combination selected for the super block that the block is a part of. For example, a direction of the block is determined and the particular constrained directional enhancement filter combination (e.g., the particular filter strengths) is applied along the direction as discussed further herein.

As used herein, a super block is a block of any size block of a frame that has a corresponding particular constrained directional enhancement filter combination and includes blocks that may be individually filtered using the particular constrained directional enhancement filter combination along a detected direction. In particular, within the scope of the Alliance for Open Media (AOM), AOMedia Video 1 (AV1) is a next-generation video codec. In the context of AV1, a super block may be 64×64 pixels and may include 16 8×8 blocks. Furthermore, as used herein, a constrained directional enhancement filter combination is a filter that includes a linear deringing filter and a low-pass filter offset spatially with respect to the linear deringing filter. The linear deringing filter and low-pass filter may be implemented simultaneously or sequentially to filter pixel values of a reconstructed frame to generate a filtered reconstructed frame as discussed further herein. As used herein, the term filter strength indicates the likelihood the filter will smooth pixel values. High filter strength filters are more likely to smooth pixels than low filter strength filters. Such filter strength may be implemented using any suitable technique or techniques. In some embodiments, higher filter strength is implemented using filter weights that emphasize pixel values other than the pixel value of the pixel being filtered in contrast to lower filter strengths implemented by de-emphasizing (with lower weights) pixel values other than the pixel value of the pixel being filtered. In some embodiments, higher filter strength is implemented by lowering the likelihood that pixel values other than the pixel value of the pixel being filtered is discarded in the application of the filter. For example, constrained filtering may including constraining use of pixel values to those that are within a threshold of the pixel value of pixel being filtered. By reducing the constraint (e.g., by allowing greater variance in the pixel values used for filtering), the constrained filter is a stronger filter relative to a weaker filter that allows very little difference the pixel values used for filtering from the pixel value of the pixel being filtered. Using any such techniques, as discussed, high strength filters are more likely to smooth pixels than low filter strength filters.

With continued reference to AV1, AV1 includes constrained directional enhancement filtering (CDEF) to remove coding artifacts and improve the objective quality measurement at the same time. As discussed, the CDEF includes a directional deringing filter implemented by detecting a direction of each block and adaptively filtering along the identified direction and a low-pass filter directions unaligned with the identified direction. Both the directional deringing filter and the low-pass filter are constrained in that they may ignore pixel values for particular filter taps when the pixel values differ greatly (as tested by thresholding) from the pixel value of the pixel being filtered. In AV1, the constrained directional deringing filter can support up to 16 available filter selections and the constrained low-pass filter can support up to four filter levels for each deringing filter for a total of 64 available constrained directional enhancement filter combinations. From the 64 available constrained directional enhancement filter combinations, up to 8 constrained directional enhancement filter combinations may be used per frame (e.g., only the selected constrained directional enhancement filter combinations may be used for the frame), one constrained directional enhancement filter combination is used per super block (SB) (e.g., only the selected constrained directional enhancement filter combinations may be used for the SB), and each block of the SB is filtered by detecting a direction and applying the constrained directional enhancement filter combination along the detected direction (e.g., from among 8 directions). Therefore, for implementation of CDEF, a best filter combination is selected for each SB in Luminance plane and Chroma planes. The selected up to 8 constrained directional enhancement filter combinations for each frame (from the 64 available combinations) may be encoded in the frame header for the frame. For each SB in the frame, the selected one filter combination is signaled (e.g., indexed) and encoded.

The techniques discussed herein for selecting the number of CDEF combinations for each frame, the subset of CDEF combinations (e.g., as indicated by filter strength) from the available CDEF combinations, and the selection from the subset of a CDEF combination for each SB provide for an adaptive and fast CDEF solution. In some embodiments, the frame level filter combinations of each frame are firstly decided by frame level QP and/or content analysis. In contrast to full search approaches, the number of filter operations is reduced from 64 to less or equal to 8. Thereby, the techniques discussed herein provide reduced complexity, faster operation, reduced memory transfers, more efficient computing, and reduced power requirements. Furthermore, the discussed techniques remove dependencies between SB such that parallel multi-threading may be applied on SBs for the frame, which may further increase the performance of the device implementing them. In comparison with full search techniques, the techniques discussed herein provide comparable visual quality and BDRATE gain.

FIG. 1 is an illustrative diagram of an example system 100 for video coding, arranged in accordance with at least some implementations of the present disclosure. As shown in FIG. 1, system 100 includes a video analysis module 101, flat frame determination module 102 (labeled "Flat Frame?" in FIG. 1), a QP zone adaptive frame level CDEF combinations decision module 103, a low QP analysis module 104 (labeled "QP<$TH_1$?" in FIG. 1), a disable CDEF module 105, a super block level CDEF selection module 106, a CDEF filtering module 107, and an entropy encode module 108. Also as shown, video analysis module 101 (and other modules of system 100 as needed) receives input video 111 and QP zone adaptive frame level CDEF combinations decision module 103 (and other modules of system 100 as needed) receives frame level QPs 112 (e.g., a frame level QP for each frame of input video 111) and frame types 113 (a frame type for each frame of input video 111).

For example, system 100 may receive input video 111 for coding and system 100 may provide video compression to generate a bitstream 118 such that system 100 may be a video encoder implemented via a computer or computing device or the like. As discussed further herein, frame level CDEF combinations 114 are determined using frame level QPs 112 and optional video analysis data. Furthermore, SB level CDEF selections 116 are generated using only frame level CDEF combinations 114 (e.g., other codec available CDEF combinations are not used). Indicators indicative of frame level CDEF combinations 114 and SB level CDEF selections 116 are coded, via entropy encode module 108, into bitstream. Furthermore, reconstructed frame 115 is filtered to generate filtered frame 119, via CDEF filtering module 107, using SB level CDEF selections 116 to filter blocks by detecting a direction of each block and filtering using the SB level CDEF selection of the SB that the block is a part of Filtered frame 119 may be provided to a frame buffer (not shown) and used in inter-prediction, for example. Notably, a decoder (not shown) may reconstruct filtered frame 119 for presentment to a user. Bitstream 118 may be any suitable bitstream such as a standards compliant bitstream. For example, bitstream 118 may be AOMedia Video 1 (AV1). System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

System 100 may include other modules or components not shown for the sake of clarity of presentation. For example, system 100 may include a partition module, a transform module, a quantization module, an intra prediction module, a motion estimation module, a motion compensation module, a sample adaptive offset (SAO) filtering module, a scanning module, etc., some of which are discussed with respect to FIG. 11 herein. In some examples, in system 100, CDEF filtering module 107 is implemented in a local decode loop that generates filtered frames 119 that are stored in a frame buffer (not shown) and used in the encoding process as reference pictures for motion estimation and compensation. Furthermore, the local decode loop may include an inverse quantization module, an inverse transform module, and an adder for combining reconstructed residual blocks with reference blocks.

As discussed, system 100 receives input video 111. Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques discussed herein are discussed with respect to frames, slices, super blocks, and blocks for the sake of clarity of presentation. However, such frames may be characterized as pictures, video pictures, sequences of pictures, video sequences, etc., such super blocks may be characterized as largest coding units, and such blocks may be characterized as coding units, coding blocks, macroblocks, sub-units, sub-blocks, etc. For example, a picture or frame of color video data may include a luminance plane or component and two chrominance planes or components at the same or different resolutions with respect to the luminance plane. Input video 111 may include pictures or frames that may be divided into blocks of any size, which contain data corresponding to blocks of pixels. Such blocks may include data from one or more planes or color channels of pixel data.

Figures 2, 3:
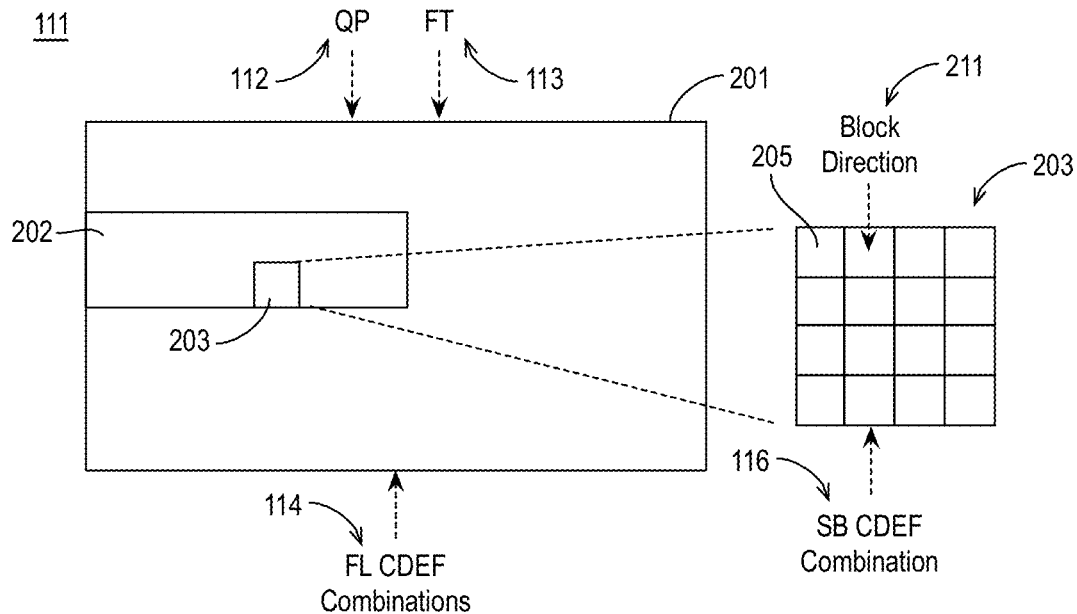
FIG. 2 illustrates an example video frame.
FIG. 3 illustrates example constrained directional enhancement filter (CDEF) directions.

FIG. 2 illustrates an example video frame 201, arranged in accordance with at least some implementations of the present disclosure. Frame 201 may include any picture of a video sequence or clip such as a VGA, HD, Full-HD, 4K, 5K, etc. video frame. As shown, video frame 201 may be segmented into one or more slices as illustrated with respect to slice 202 of video frame 201. Furthermore, video frame 201 may be segmented into one or more super blocks as illustrated with respect to super block 203, which may, in turn, be segmented into one or more blocks 205. In the illustrated embodiment, video frame 201 is segmented into super blocks, which are segmented into blocks. However, any frame or picture structure may be used that divide the frame into macroblocks, blocks, units, sub-units, etc. As used, herein, the term block may refer to any partition or sub-partition of a video picture that is at the sub-picture and sub-slice level. For example, a block may refer to a coding unit, a prediction unit, a transform unit, a macroblock, a coding block, a prediction block, a transform block, or the like.

Furthermore, as shown in FIG. 2, video frame 112 has quantization parameter (QP) 112 and frame type (FT) 113 corresponding thereto. QP 112 may be any suitable value or parameter that determines a step size for associating transformed coefficients with a finite set of steps during quantization. For example, residuals of frame 201 may be transformed from the spatial domain to the frequency domain using an integer transform that approximates a transform such as the discrete cosine transform (DCT). QP 112 determines the step size for associating the transformed coefficients with a finite set of step such that lower QP values retain more information while higher QP values lose more information in the inherently lossy process of quantization. FT 113 may be any frame type such as intra (I), predicted (P), bidirectional (B), etc. Also as shown, video frame 201 has frame level (FL) CDEF combinations 114 corresponding thereto. FL CDEF combinations 114 may be determined as discussed further herein. Notably, any super block 203 or block 205 of frame 201 may only use one of FL CDEF combinations 114 to perform CDEF filtering. Furthermore, super block 203 has a super block (SB) CDEF combination 116 corresponding thereto. SB CDEF combination 116 may be determined as discussed further herein. Notably, any block 205 of super block 203 may only use SB CDEF combination 116 to perform CDEF filtering thereof. In particular, during CDEF filtering, for each block 205, a block direction 211 is determined. SB CDEF combination 116 is then applied according to block direction 211. Such processing is repeated for each block 205 of super block 203. For a next super block, the process is repeated for each block thereof with only the SB CDEF combination for the next SB being used.

FIG. 3 illustrates example constrained directional enhancement filter (CDEF) directions 300, arranged in accordance with at least some implementations of the present disclosure. For example, for each block 205 (please refer to FIG. 2), one of directions 300 may be detected for the block using any suitable technique or techniques such as direction searching based on pixels of reconstructed frame 115 (please refer to FIG. 1) using pattern matching techniques or the like. As shown, each block may have a corresponding direction, d, indexed as 0 (e.g., at about 45° with respect to horizontal), 1 (e.g., at about 22.5° with respect to horizontal), 2 (e.g., about horizontal), 3 (e.g., at about 157.5° with respect to horizontal), 4 (e.g., at about 135° with respect to horizontal), 5 (e.g., at about 112.5° with respect to horizontal), 6 (e.g., about vertical), or 7 (e.g., at about 67.5° with respect to horizontal). Although illustrated with respect to 8 available directions, any suitable number of directions may be used. In the context of FIG. 3, when a direction, d, of a block is detected, the constrained linear deringing filter is applied along the direction (as indicated by matching numbers) and the low-pass filter is applied offset with respect to direction, d, by 45° as is discussed herein below with respect to FIGS. 5 and 6.

Returning to FIG. 1, as shown, video analysis module 101 receives input video 111. Video analysis module 101 may analyze input video 111 using any suitable technique or techniques such as rate distortion optimization techniques to provide coding decisions such as frame level QPs 112, frame types, 113, frame level noise, frame level variance, etc. In other embodiments, video preprocessing or encode controller modules may generate such coding decisions and/or provide such frame data. Notably, frame level noise and/or frame level variance may be provided to flat frame determination module 102, which may determine whether each frame of input video 111 is flat or not flat based on flatness check of each frame. Such a flat or not flat determination may be made using any suitable technique or techniques. In an embodiment, the frame level variance is compared to a threshold. When the frame level variance is less than (e.g., compares unfavorably to) the threshold, the frame is deemed to be flat and, when the frame level variance is greater than (e.g., compares favorably to) the threshold, the frame is deemed to be not flat. If the frame is deemed to be flat, a signal is provided to disable CDEF module 105 and CDEF filtering and CDEF filter combination selection is bypassed or skipped for the frame as shown with respect to disable signal 117, which may be encoded via entropy encode module 108 (e.g., in a frame header for the frame).

If the frame is deemed to be not flat, a signal is provided QP zone adaptive frame level CDEF combinations decision module 103 and FL CDEF combinations 114 are determined for the frame. FL CDEF combinations 114 may be determined using any suitable technique or techniques. In an embodiment, a QP zone is applied to the current frame based on one or more of the frame level QP, the frame type, and video analysis data of the frame.

Figure 4:
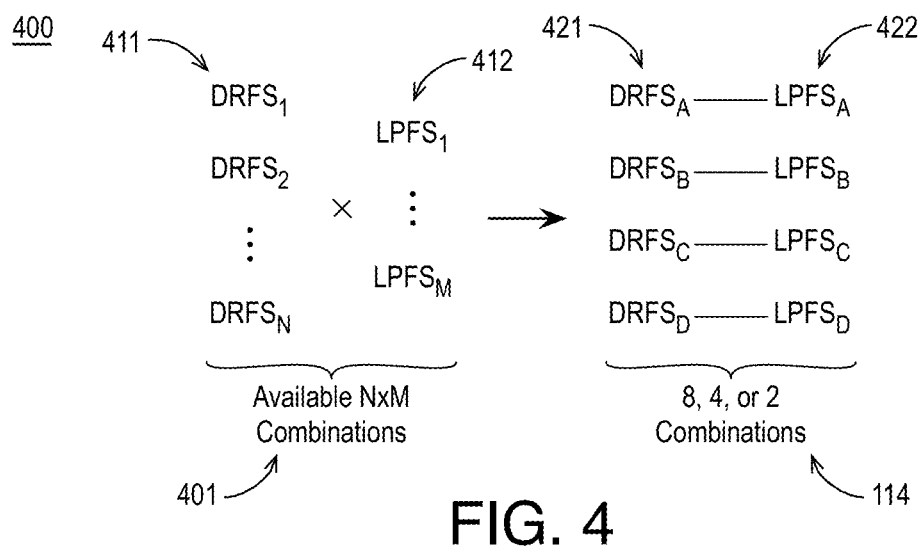
FIG. 4 illustrates an example data structure indicating selection of frame level (FL) constrained directional enhancement filtering (CDEF) combinations from available FL CDEF combinations.

FIG. 4 illustrates an example data structure 400 indicating selection of frame level (FL) constrained directional enhancement filtering (CDEF) combinations 114 from available FL CDEF combinations 401, arranged in accordance with at least some implementations of the present disclosure. As shown in FIG. 4, any number (e.g., 2, 4, or 8) FL CDEF combinations 114 may be selected from available FL CDEF combinations 401 such that FL CDEF combinations 114 are a subset of available FL CDEF combinations 401. As used herein, the term subset indicates the group is a set of which all elements thereof are members of another set. In this context, each element or member (e.g., CDEF combination) of FL CDEF combinations 114 is a member of available FL CDEF combinations 401. For example, available FL CDEF combinations 401 may include any number of deringing filter strengths (DFRS) 411 such as N deringing filter strengths 411 and any number of low-pass filter strengths (LPFS) 412 such as M low-pass filter strengths 412 in any combination such that available FL CDEF combinations 401 include N×M available FL CDEF combinations 401. In the context of AV1, the discussed constrained linear deringing filters may include 16 filter selections (e.g., N=16) and the discussed constrained low-pass filters may include 4 filter levels (e.g., M=4) for 64 total available FL CDEF combinations 401. However, any number of deringing filter strengths 411 and low-pass filter strengths 412 may be used.

In an embodiment, a deringing filter strength 411 includes a parameter to determine a maximum allowable difference between a pixel value of a pixel being filtered and a pixel value of a filter tap of the constrained directional enhancement filter such that, when the difference compares unfavorably with the maximum allowable difference, the pixel value of the filter tap is discarded and when the difference compares favorably with the maximum allowable difference, the pixel value is used in determining a filtered pixel value for the being filtered. Similarly, in an embodiment, a low-pass filter strength 412 includes a parameter to determine a maximum allowable difference between a pixel value of a pixel being filtered and a pixel value of a filter tap of the constrained directional enhancement filter such that, when the difference compares unfavorably with the maximum allowable difference, the pixel value of the filter tap is discarded and when the difference compares favorably with the maximum allowable difference, the pixel value is used in determining a filtered pixel value for the being filtered. In some embodiments, the filter taps for the linear deringing filter are characterized as primary filter taps and the filter taps for the low-pass filter are characterized as secondary filter taps as discussed herein below. In any event, higher deringing filter strengths 411 and low-pass filter strengths 412 tend to smooth pixel values relative to lower deringing filter strengths 411 and low-pass filter strengths 412.

As shown, from available FL CDEF combinations 401, a number (e.g., 8, 4, or 2 in the illustrated example, although any number less than available FL CDEF combinations 401 may be used) of FL CDEF combinations 114 are determined. In an embodiment, the number of FL CDEF combinations 114 (e.g., the number of filter combinations to be used) as well as the filter the combinations themselves are determined based on the frame level QP. In the illustrated example, 4 FL CDEF combinations 114 are illustrated such that each has a deringing filter strength 421 (indicated as A, B, C, D, respectively) and each has a low-pass filter strength 422 (indicated as A, B, C, D, respectively). The combinations may include any unique combinations of deringing filter strengths 411 and low-pass filter strengths 412. For example, one or both of deringing filter strengths 411 and low-pass filter strengths 412 may be repeated within deringing filter strengths 421 and low-pass filter strengths 422 so long as each combination is unique.

As discussed, deringing filter strengths 421 and low-pass filter strength 422 determine filter strengths applied to a pixel.

Figures 5, 6:
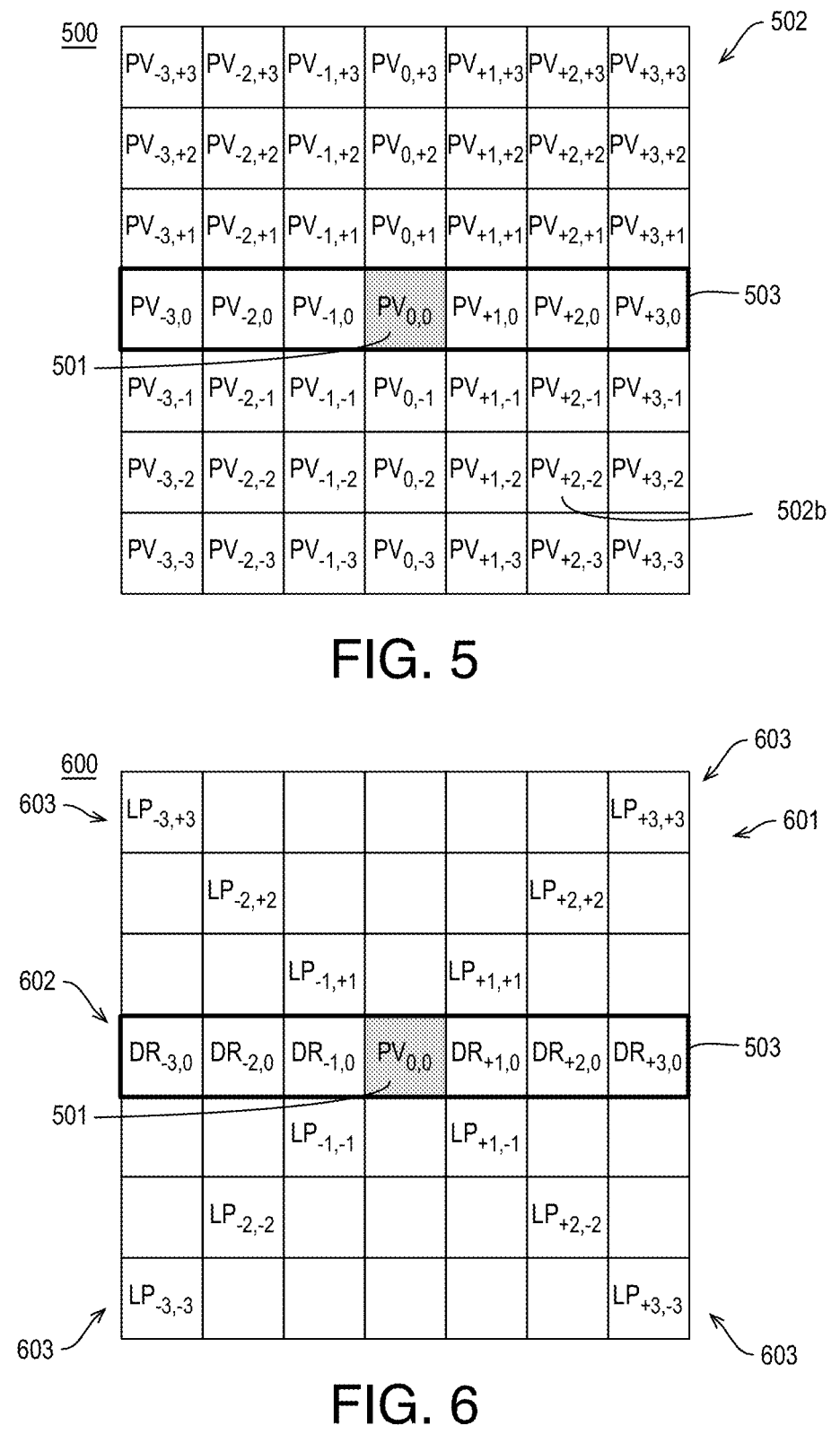

FIG. 5 illustrates example pixel values 500 of pixel to be filtered 501 and neighboring pixels 502, arranged in accordance with at least some implementations of the present disclosure. As shown in FIG. 5, pixel to be filtered 501 (e.g., a target pixel) has a pixel value, $PV_{0,0}$ and is surrounded by neighboring pixels 502 having pixel values labeled based on their position with respect to pixel to be filtered 501 with +1 being one pixel position to the right or up, −3 being three pixel positions left or down, and so on such that, for example, neighboring pixel 502b has a pixel value of $PV_{+2,-2}$. In the example of FIG. 5, pixel to be filtered 501 is being filtered along a detected direction 503 such that detected direction 503 is horizontal (e.g., d=2). However, the discussed techniques may be applied to any detected direction.

FIG. 6 illustrates example filter taps 600 of an example constrained directional enhancement filter (CDEF) combination 601, arranged in accordance with at least some implementations of the present disclosure. As shown in FIG. 6, deringing filter taps 602 (labeled DR) are applied along detected direction 503 while low-pass filter taps 603 (labeled LP) are applied misaligned with respect to detected direction 503 such as at about 45° and 135° with respect to detected direction 503. For example, low-pass filter taps 603 may be applied in a cross shape with one line of the cross being about 45° with respect to a detected direction of a block. In FIG. 6, blank pixel locations (e.g., without a filter tap) are not used in filtering pixel to be filtered 501.

When CDEF combination 601 is applied to pixel values 500, the new or filtered value for pixel to be filtered 501 is determined by multiplying a weight corresponding to each of deringing filter taps 602 and low-pass filter taps 603 and the corresponding pixel value and averaging the weighted sum (e.g., by weighted averaging) or similar techniques. It is noted that a filter tap is also located at pixel to be filtered 501 (and a corresponding weight is used). However, a filter tap location may be discarded when the pixel value at the filter tap location and the pixel value of pixel to be filtered 501 differ greater than a threshold amount. For example, such large discrepancy pixel values may be indicative of picture detail and not ringing or noise that is desired to be smoothed by a deringing filter or low-pass filter. For example, if a difference between a pixel value, $PV_{+2,-2}$, of neighboring pixel 502b and the pixel value, $PV_{0,0}$, of pixel to be filtered 501 is greater than a threshold, the pixel value, $PV_{+2,-2}$, of neighboring pixel 502b may be discarded in determining the new pixel value for pixel to be filtered 501. Similar thresholding may be applied to pixel value for deringing filter taps 602 and low-pass filter taps 603. Furthermore, deringing filter taps 602 and low-pass filter taps 603 may apply different threshold values. In an embodiment, the threshold values are determined based on deringing filter strength 421 and low-pass filter strength 422 of a CDEF combination.

As discussed, by varying the threshold values, the filter strength is adjusted as a larger threshold value tends to include more neighboring pixel values (and therefore is a stronger filter) and a smaller threshold value tends to exclude more neighboring pixel values (and therefore is a weaker filter). Also, as noted, the filter strengths between the deringing filter portion and the low-pass filter portion may be different. Thereby, various combinations may be generated.

In an embodiment, a new pixel value for pixel to be filtered 501 is generated as shown in Equations (1) as follows:

$$y(i, j) = x(i, j) + \sum_{m,n} w_{d,m,n}^{(DR)} f(x(m, n) - x(i, j), S^{(DR)}, D) + \sum_{m,n} w_{d,m,n}^{(LP)} f(x(m, n) - x(i, j), S^{(LP)}, D) \quad (1)$$

where y is a new pixel value (e.g., of pixel to be filtered 501), x is a previous pixel value, (i, j) is the pixel location of pixel to be filtered 501, $w^{(DR)}$ are weights for deringing filter taps 602, m and n are counter variables to move through taps 602, 603 based on direction, d, $f$ is a constraint function, $S^{(DR)}$ is a strength of deringing filter taps 602, $w^{(LP)}$ are weights for deringing filter taps 603, $S^{(LP)}$ is a strength of low-pass filter taps 603, and D is a damping parameter.

The constraint function, $f$, may be any suitable constraint function to discard particular pixel values that are outside of a threshold of the pixel value of pixel to be filtered 501. For example, constraint function, $f$, may provide for a difference between a pixel value at a filter tap and a pixel value at a pixel to be filtered (e.g., x(m,n)−x(i,j)) a value of the difference when the difference is less than a threshold (e.g., an absolute value is less than the threshold) or a value of zero when the difference is greater than a threshold (e.g., an absolute value is greater than the threshold).

In some embodiments, the strength of the filter combination may be adjusted using weights for deringing filter taps 602, $w^{(DR)}$ and/or weights for deringing filter taps 603, $w^{(LP)}$. For example, larger weights for deringing filter taps 602 increase the strength of the deringing filter portion of the CDEF combination and larger weights for low-pass filter taps 603 increase the strength of the low-pass filter portion of the CDEF combination. In some embodiments, the strength of the filter combination may be adjusted using strength of deringing filter taps 602, $S^{(DR)}$, and/or strength of low-pass filter taps 603, $S^{(LP)}$. For example, larger strengths for deringing filter taps 602 increase the threshold for use of pixel values and thereby the strength of the deringing filter portion of the CDEF combination and larger weights for low-pass filter taps 603 increase the threshold for use of pixel values and thereby the strength of the low-pass filter portion of the CDEF combination. Such weight and strength variations may be made using any suitable combination.

Returning to FIG. 1, as discussed, if a frame is deemed to be not flat, a signal is provided QP zone adaptive frame level CDEF combinations decision module 103 and FL CDEF combinations 114 are determined for the frame. In an embodiment, as shown with respect to low QP analysis module 104, when frame level QP 112 is less than a first threshold, $TH_1$, a signal is provided to disable CDEF module 105 and CDEF filtering and CDEF filter combination selection is bypassed or skipped for the frame as shown with respect to disable signal 117, which may be encoded via entropy encode module 108 (e.g., in a frame header for the frame). Threshold $TH_1$ may be any suitable value. For example, as used herein a QP range of 0 to 255 may be used throughout. However, any QP range from a QPmin to a QPmax value may be used. For a QP range of 0 to 255, threshold $TH_1$ is in the range of about 8 to 14 with 11 being particularly advantageous. For example, threshold $TH_1$ may be about 3.0 to 5.5% of a QPmax value.

For remaining frame level QPs 112, the particular frame level QP may be assigned to a particular zone (or range) of QP values and a corresponding number and actual FL CDEF combinations 114 based on the assigned QP zone.

Figure 7:
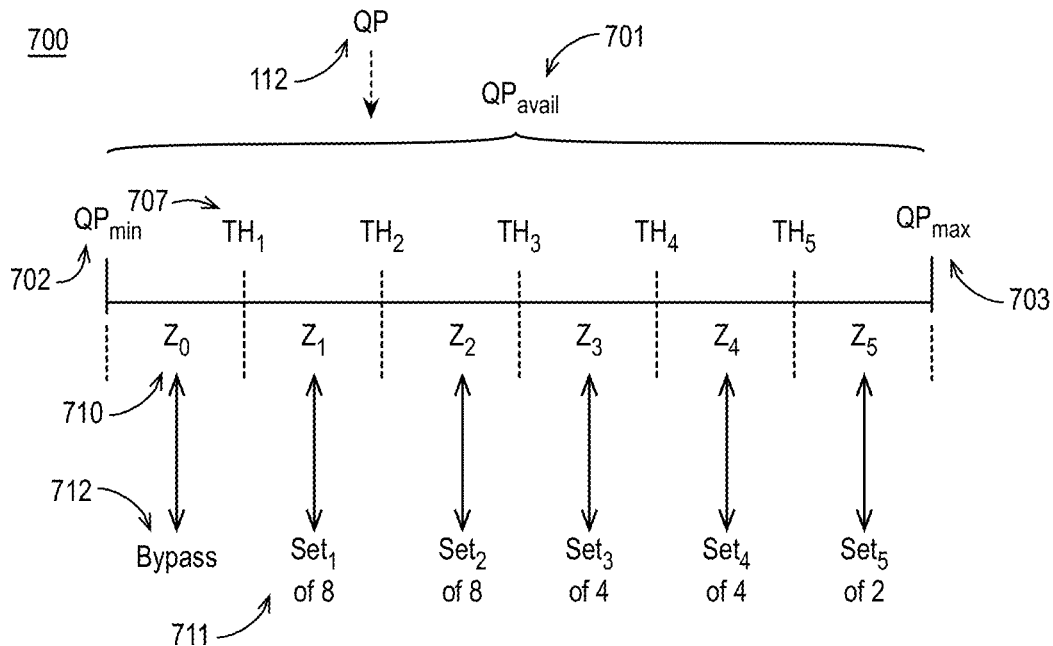
FIG. 7 illustrates an example quantization parameter to subset of constrained directional enhancement filter combinations mapping data structure.

FIG. 7 illustrates an example quantization parameter to subset of constrained directional enhancement filter combinations mapping data structure 700, arranged in accordance with at least some implementations of the present disclosure. As shown in FIG. 7, a range of available quantization parameters 701 (e.g., for a frame level QP) extends from a minimum available quantization parameter 702 (labeled $QP_{min}$) to a maximum available quantization parameter 703 (labeled $QP_{max}$), inclusive. Minimum available quantization parameter 702 and the maximum available quantization parameter 703 may be any suitable values based on the codec being implemented. For example, AV1, minimum available quantization parameter 702 may be zero or one and maximum available quantization parameter 703 may be 255. For example, available quantization parameters 701 may be integer values extending from minimum available quantization parameter 702 to maximum available quantization parameter 703.

In an embodiment, range of available quantization parameters 701 is segmented, divided, or separated into multiple zones 710 such that each of zones 710 includes multiple consecutive quantization parameters of range of available quantization parameters 701. Multiple zones 710 may include any number of zones 710 such as four, five, six (as illustrated), seven, or more. In the illustrated embodiment, zones 710 are labeled $Z_0, Z_1, \ldots, Z_5$. As shown, zone $Z_0$ includes quantization parameters from minimum available quantization parameter 702 through a first quantization parameter threshold of quantization parameter thresholds 707 (labeled $TH_1, TH_2, \ldots TH_5$), zone $Z_1$ includes quantization parameters from first quantization parameter threshold $TH_1$ through a second quantization parameter threshold $TH_2$, zone $Z_2$ includes quantization parameters from second quantization parameter threshold $TH_2$ through a third quantization parameter threshold $TH_3$, zone $Z_3$ includes quantization parameters from third quantization parameter threshold $TH_3$ through a fourth quantization parameter threshold $TH_4$, zone $Z_4$ includes quantization parameters from fourth quantization parameter threshold $TH_4$ through a fifth quantization parameter threshold $TH_5$, and zone $Z_5$ includes quantization parameters from fifth quantization parameter threshold $TH_5$ through maximum available quantization parameter 703. In an embodiment, the whole QP range as provided by range of available quantization parameters 701 may be separated into six zones as shown, however any number of zones may be implemented.

Threshold values $TH_1, TH_2, \ldots TH_5$ may include any suitable values. In an embodiment, for a range of available quantization parameters 701 extending from zero to 255, $TH_1$ is in the range of about 8 to 14 with 11 being particularly advantageous, $TH_2$ is in the range of about 80 to 100 with 90 being particularly advantageous, $TH_3$ is in the range of about 120 to 140 with 130 being particularly advantageous, $TH_4$ is in the range of about 130 to 150 with 140 being particularly advantageous, and $TH_5$ is in the range of about 190 to 210 with 200 being particularly advantageous. For example, in some embodiments, $TH_1$ is in the range of 3.0 to 5.5% of maximum available quantization parameter 703 (e.g., 4 to 4.5%), $TH_2$ is in the range of 30 to 40% of maximum available quantization parameter 703 (e.g., 32 to 36%), $TH_3$ is in the range of 45 to 55% of maximum available quantization parameter 703 (e.g., 49 to 53%), $TH_4$ is in the range of 50 to 60% of maximum available quantization parameter 703 (e.g., 52 to 58%), and $TH_5$ is in the range of 73 to 83% of maximum available quantization parameter 703 (e.g., 76 to 80%).

Also as shown, each or some of zones 710 are associated with, assigned, or provided a corresponding subset of constrained directional enhancement filter (CDEF) combinations 711 and a number of CDEF combinations therein (or a bypass instruction for the case of zone $Z_0$). As shown, in an embodiment, zone $Z_0$ is associated with an instruction to bypass CDEF 712, zone $Z_1$ is associated with an instruction to associate 8 CDEF filter combinations (e.g., $set_1$) with the frame, zone $Z_2$ is associated with an instruction to associate 8 different CDEF filter combinations (e.g., $set_a$) with the frame, zone $Z_3$ is associated with an instruction to associate 4 CDEF filter combinations (e.g., $set_3$) with the frame, zone $Z_4$ is associated with an instruction to associate 4 CDEF filter combinations (e.g., $set_a$) with the frame, and zone $Z_5$ is associated with an instruction to associate 2 CDEF filter combinations (e.g., $set_5$) with the frame. In an embodiment, a zone of zones 710 is determined for frame level QP 112 (e.g., a determination is made as to which of zones 710 falls into) and a corresponding number CDEF combinations 711 (e.g., 2, 4, or 8) and the CDEF combinations 711 themselves (e.g., a subset of DRFS and LPFS values) are associated with the frame. For example, with reference to FIG. 1, such operations may be performed by QP zone adaptive frame level CDEF combinations decision module 103. For example, for a FL QP 112 within zone $Z_0$, determining a subset of CDEF combinations for the frame is bypassed or skipped responsive to the FL QP 112 not exceeding threshold $TH_1$.

Figure 8:
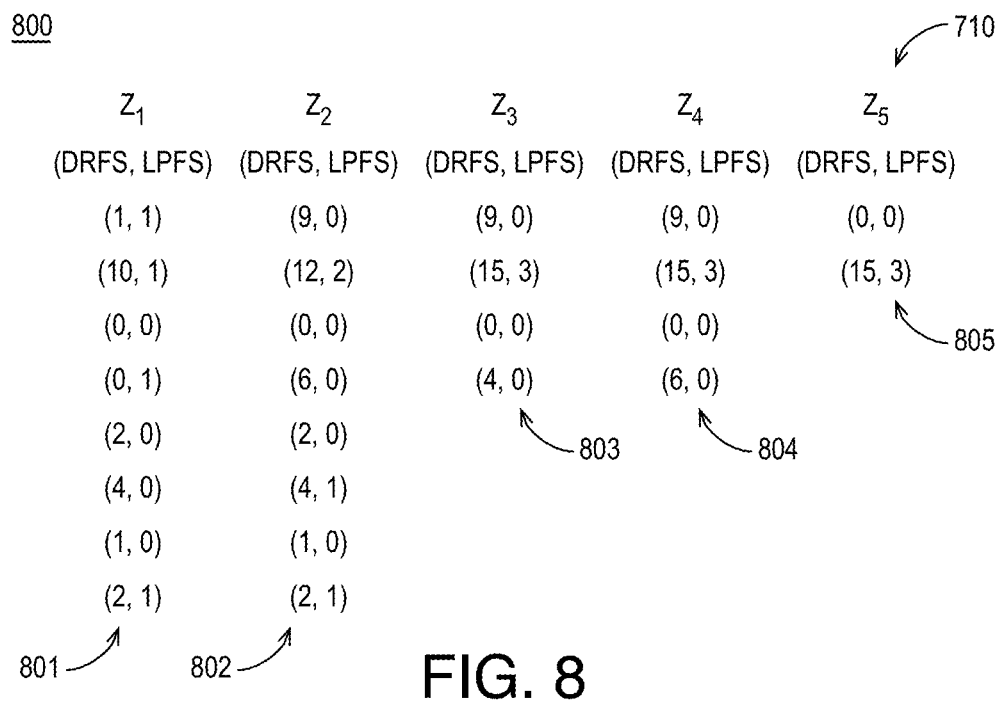
FIG. 8 illustrates example constrained directional enhancement filter (CDEF) combinations for exemplary quantization parameter zones.

FIG. 8 illustrates example constrained directional enhancement filter (CDEF) combinations 800 for exemplary quantization parameter zones 710, arranged in accordance with at least some implementations of the present disclosure. In the example of FIG. 8, each of zones $Z_1$ through $Z_5$ has a corresponding list of pairs of deringing filter strength (DRFS) and low-pass filter strength (LPFS) to provide FL CDEF combinations 801, 802, 803, 804, 805 for implementation as discussed herein. Each of DRFS and LPFS provides a relative filter strength such that greater numbers correspond to greater filter strength. Such filter strengths may be implemented in any manner discussed herein. In an embodiment, a greater filter strength number is used to implement greater filter tap weights for the filter (e.g., greater DRFS applies greater DR filter tap weights, $w^{(DR)}$, relative to smaller filter strength number and greater LPFS applies greater LP filter tap weights, $w^{(LP)}$, relative to smaller filter strength numbers). In an embodiment, the greater filter strength number is used as or used to determine a threshold for excluding pixel values for particular filter taps. As discussed, excluding fewer pixel values (e.g., by implementing a greater threshold) provides for stronger filtering via the DR filter taps and/or the LP filter taps. In some embodiments, the DRFS or LPFS indicates a pixel value threshold directly. In some embodiments, the DRFS or LPFS is translated to a pixel value threshold using a function such as a monotonically increasing function or the like. For example, the threshold for $x(m,n)-x(i,j)$ may be a monotonically increasing function of DRFS or LPFS such that the $TH^{DR}=F(DRFS)$ and $TH^{LP}=F(LPFS)$ increases with increasing DRFS or LPFS.

As illustrated with respect to FIGS. 7 and 8, for some or all of zones 710, a number of constrained directional enhancement filter (CDEF) combinations are determined for inclusion in each subset. For example, for zones $Z_1$ and $Z_2$, 8 CDEF combinations are provided (as shown with respect to CDEF combinations 801, 802), for zones $Z_3$ and $Z_4$, 4 CDEF combinations are provided (as shown with respect to CDEF combinations 803, 804), and for zone $Z_5$, 2 CDEF combinations are provided (as shown with respect to CDEF combinations 805). The number of CDEF combinations are determined using the QP zone techniques discussed herein. In an embodiment, when FL QP 112 compares favorably to a threshold (e.g., exceeds $TH_3$ or $TH_5$), the number of CDEF combinations is a first value (e.g., 4 or 2, respectively) and when FL QP 112 does not compare favorably to the threshold (e.g., does not exceed $TH_3$ or $TH_5$), the number of constrained directional enhancement filter combinations is a second value (e.g., 8 or 4, respectively) less than the first value. For example, for high bitrate coding (e.g., relatively low FL QP 112), the number of bits used by CDEF tends to be a small percentage of the overall number of bits for encoding. From rate distortion point view, distortion is relatively more important than rate in such instances and it is advantageous to use more CDEF combinations to achieve better visual quality. For low bitrate coding (e.g., relatively high FL QP 112), it is advantageous to use fewer CDEF combinations such that the number of bits used by CDEF will not be a big percentage of the overall number of bits.

With reference to FIG. 8, as shown, CDEF combinations 801, 802 both include the same number (e.g., 8) of combinations. Furthermore, there is some overlap between the selected filters. However, each filter combination of CDEF combinations 801 is not as strong as the strongest filter combination of CDEF combinations 802 (e.g., combination (12, 2)). For example, for a first frame having a first FL QP value and for a second frame having a second FL QP value, such that the second FL QP is less than the first FL QP, a second subset of CDEF combinations for the second frame and a first subset of CDEF combinations for the first frame may have the same number of CDEF combinations such that the second subset includes only constrained directional enhancement filter combinations having lower filter strengths than a strongest constrained directional enhancement filter combination of the first subset. That is, no filter combination of CDEF combinations 801 is as strong as (or stronger than) the strongest filter combination of CDEF combinations 802. Similarly, no filter combination of CDEF combinations 802 is as strong as (or stronger than) the strongest filter combination of CDEF combinations 803. In an embodiment, the strongest CDEF combination of a subset and a strongest CDEF combination of a second subset differ and remaining CDEF combinations are the same.

Any suitable combinations of CDEF may be used. Typically, for a higher FL QP, stronger filters are used and for lower FL QP, weaker filters are used. Furthermore, for a higher FL QP, fewer filter combinations are used and for lower FL QP, more filter combinations are used. In some embodiments, CDEF combination values may be coded to integrate the deringing filter strength and low-pass filter level or strength together into a combination value. In an embodiment, the deringing filter strength is a combination value divided by 4 and the low-pass filter level or strength is the combination value modular by 4. For example, a combination value of 63 provides deringing filter strength of 15 (e.g., 63/4=15) and a low-pass filter level of 3 (e.g., 64%4=3. In general, low strength filters are used for low QP coding and at least one high strength filter should be used for high QP coding.

For example, the discussed embodiments may be implemented using combination values as follows. If FL QP is less than threshold $TH_1$, CDEF is disabled for the current frame, else if FL QP is in the QP zone with second smallest QP range (e.g., threshold $TH_1$ to $TH_2$, 8 CDEF combinations are used with a first set of selected filter combination values: 5, 41, 0, 1, 8, 16, 4, 9, else if FL QP is in the QP zone with third smallest QP range (e.g., threshold $TH_2$ to $TH_3$, 8 CDEF combinations are used with a second set of selected filter combination values: 36, 50, 0, 24, 8, 17, 4, 9, else if FL QP is in the QP zone with fourth QP range (e.g., threshold $TH_3$ to $TH_4$, 4 CDEF combinations are used with a third set of selected filter combination values: 36, 63, 0, 16, else if FL QP is in the QP zone with fifth QP range (e.g., threshold $TH_4$ to $TH_5$, 4 CDEF combinations are used with a fourth set of selected filter combination values: 36, 63, 0, 24, and else if FL QP is in the biggest QP range (threshold $T_5$ to 255), 2 CDEF combinations are used with a fifth set of selected filter combination values: 0, 63.

In the above described embodiments, six QP zones are used for CDEF coding. Furthermore, in such embodiments, the chroma plane and luma planes use the same CDEF combinations. However, a number QP zones other than 6 may be applied and chroma plane and luma plane may use different CDEF combinations. Further still, for different frame types and video resolutions, the QP zone separation and CDEF combinations may differ. Although the example filters are showed in particular order, any order is allowed.

Returning again to FIG. 1, QP zone adaptive frame level CDEF combinations decision module 103 determines FL CDEF combinations 114 for a frame as discussed herein. For example, FL CDEF combinations 114 may be any of FL CDEF combinations 801, 802, 803, 804, 805 (e.g., indicating deringing filter strength (DRFS) and low-pass filter strength (LPFS)) or any other FL CDEF combinations discussed herein. Such FL CDEF combinations 114 are provided to entropy encode module 108 for inclusion in bitstream 118. For example, FL CDEF combinations 114 are encoded to correspond to a current frame by encode into a frame header or the like.

Also as shown, FL CDEF combinations 114 are provided to super block (SB) level CDEF selection module 106, which determines, for each SB of the current frame, a selected one of FL CDEF combinations 114. For example, only FL CDEF combinations 114 may be used for the current frame while others are excluded. SB level CDEF selection module 106 may select one of FL CDEF combinations 114 for each SB using any suitable technique or techniques. In an embodiment, the costs of each of FL CDEF combinations 114 are determined for each SB and a lowest cost FL CDEF combination is selected. For example, for each 64×64 SB, each of FL CDEF combinations 114 may be tested for each 8×8 block of the SB. The FL CDEF combination having the lowest cost is then selected and provided as part of SB level CDEF selections 116. As shown, SB level CDEF selections 116 are provided to entropy encode module 108 for inclusion in bitstream 118. For example, 8 CDEF combinations are used for a current frame, costs are calculated for each SB for the 8 CDEF combinations and the one with minimum cost is selected. In an embodiment, 3 bits are used to encode the index for each SB when 8 CDEF combinations are used. When 4 CDEF combinations are used for a frame, costs are calculated for each SB for the 4 CDEF combinations and the one with minimum cost is selected and 2 bits are used to encode selected CDEF combination of each SB. When 2 CDEF filter combinations are used for a frame, costs are calculated for each SB for the 2 CDEF combinations and the one with minimum cost is selected and 1 bit is used to encode the index of current SB.

Furthermore, SB level CDEF selections 116 are provided to CDEF filtering module 107, which filters reconstructed frame 115 using the selected SB level CDEF selections 116. For each block of a SB, a direction is detected and the CDEF indicated by SB level CDEF selections 116 is used to filter the block as discussed herein. As shown, after filtering each block of reconstructed frame 115, filtered frame 119 is generated. For example, filtered frame 119 may be provided to a frame buffer for use in inter prediction. It is also noted that a decoder may perform the same functions as CDEF filtering module 107 to generate a filtered frame that may be presented to a user.

Figure 9:
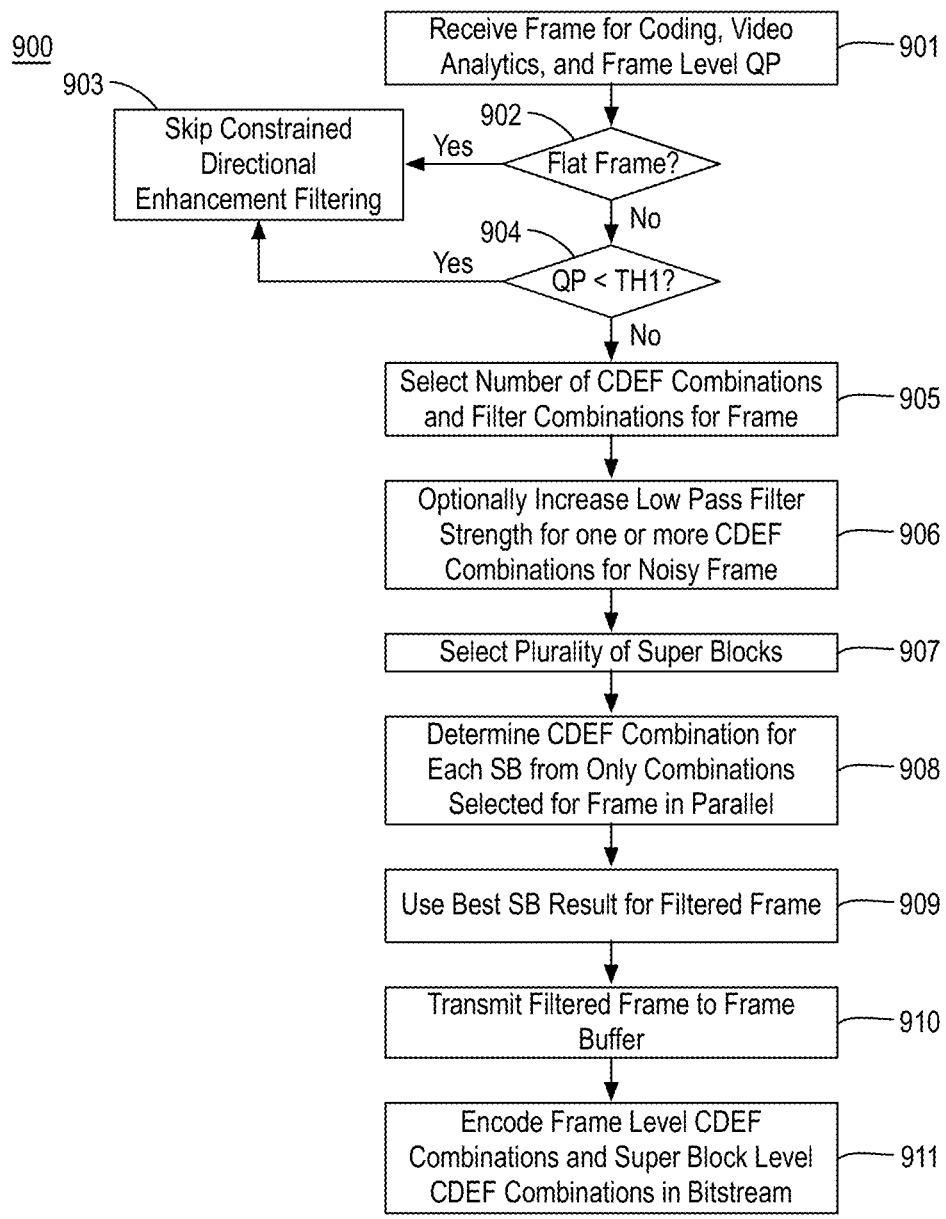
FIG. 9 is a flow diagram illustrating an example process for video coding including selecting a subset of constrained directional enhancement filter combinations for a frame.

FIG. 9 is a flow diagram illustrating an example process 900 for video coding including selecting a subset of constrained directional enhancement filter combinations for a frame, arranged in accordance with at least some implementations of the present disclosure. Process 900 may include one or more operations 901-911 as illustrated in FIG. 9. Process 900 may be performed by a device (e.g., system 100 as discussed herein) to encode input video.

Process 900 begins at operation 901, where a frame, video analytics for the frame and a frame level QP for the frame are received using any suitable technique or techniques. Processing continues at decision operation 902, where a determination is made as to whether the frame is a flat frame. In an embodiment, a frame level variance of the discussed video analytics is compared to a threshold. When the frame level variance is less than the threshold, the frame is deemed to be flat and, when the frame level variance is greater than (e.g., compares unfavorably to) the threshold, the frame is deemed to be not flat. If the frame is deemed to be flat, processing continues at operation 903 where CDEF is skipped or bypassed for the frame and processing for another frame may begin at operation 901. If the frame is deemed to be not flat, processing continues at operation 904, where a determination is made as to whether the frame level QP is less than a threshold (e.g., $TH_1$ as discussed herein). If so, processing continues at operation 903 where CDEF is skipped or bypassed for the frame and processing for another frame may begin at operation 901.

If not, processing continues at operation 905, where a number of CDEF combinations and CDEF combinations themselves are selected for the frame. In some embodiments, the frame level QP is used to determine the number of CDEF combinations. In an embodiment, for lower QPs, more CDEF combinations are used and for higher QPs, fewer CDEF combinations are used. Furthermore, the CDEF combinations may include a deringing filter strength and a low-pass filter strength as discussed herein. The selected CDEF combinations may include any CDEF combinations disused herein. In an embodiment, for lower QPs, the CDEF combinations include weaker filter strengths and for higher QPs, the CDEF combinations include stronger filter strengths. In an embodiment, a lower QP corresponds to a subset of CDEF combinations having only filter strengths that are not as strong as a strongest filter strength of a subset of CDEF combinations corresponding to a higher QP.

Processing continues at operation 906, where for the subset of CDEF combinations selected at operation 905, the low-pass filter strength is optionally increased for one or more of the CDEF combinations when the video analytics indicate a noisy frame. For example, for all non-zero low-pass filter strengths, the low-pass filter strength may be increased by one level. The determination of a noisy frame may be made using any suitable technique or techniques. In an embodiment, when the frame is deemed to be a noisy frame, each non-zero low-pass filter strength is increased by one level. For example, with reference to FIG. 8, for zone $Z_2$, FL CDEF combinations 802 may be changed from (9,0), (12,2), (0,0), (6,0), (2,0), (4,1), (1,0), (2,1) to (9,0), (12,3), (0,0), (6,0), (2,0), (4,2), (1,0), (2,2). In an embodiment, when the frame is deemed to be a noisy frame, each low-pass filter strength corresponding to a non-zero deringing filter strength is increased by one level. For example, with reference to FIG. 8, for zone $Z_2$, FL CDEF combinations 802 may be changed from (9,0), (12,2), (0,0), (6,0), (2,0), (4,1), (1,0), (2,1) to (9,1), (12,3), (0,0), (6,1), (2,1), (4,2), (1,1), (2,2). As discussed, the selected FL CDEF combinations are indexed in a bitstream syntax such as in a frame header.

Processing continues at operation 907, where multiple super blocks (SB) of the frame are selected using any suitable technique or techniques for parallel processing. At operation 908, for each of the selected SBs, a CDEF combination is selected from only the CDEF combinations determined at operation 905. That is, other CDEF combinations are not available for selection for a SB. The SB level CDEF combination selection may be performed using any suitable technique or techniques such as, for each SB, detecting a SB direction, testing all available CDEF combinations along the direction, and selecting the CDEF combination with the lowest cost. Notably, the selection of subset of CDEF combinations at operation allows for parallel processing of SBs That is, since dependency in selecting frame level CDEF combinations are decupled from SB processing, parallel multi-threading can be applied on each SB for a current frame when making SB level CDEF combination selection. Furthermore, the discussed techniques provide improved computational efficiency as exhaustive searching of all available CDEF combinations is avoided. As discussed, the selected FL CDEF combination for each SB is indexed in a bitstream syntax. Processing continues at operation 909 where the best filter result for each SB is used for the filtered frame. Alternatively, such SB filtering may be repeated using the selected CDEF combination.

Processing continues at operation 910, where the filtered frame may be stored to a frame buffer for use as a reference frame. Processing continues at operation 911, where the FL CDEF combinations and the SB level CDEF combinations are encoded into a bitstream using any suitable technique or techniques.

Figure 10:
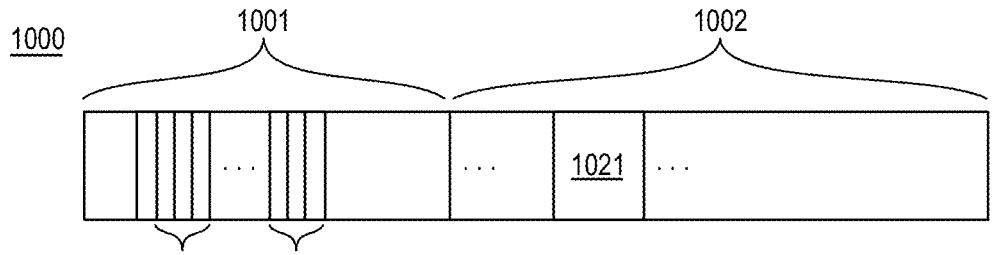
FIG. 10 illustrates an example bitstream indicating a selected subset of constrained directional enhancement filter combinations for a frame.

FIG. 10 illustrates an example bitstream 1000 indicating a selected subset of constrained directional enhancement filter combinations for a frame, arranged in accordance with at least some implementations of the present disclosure. In some examples, bitstream 1000 may correspond to bitstream 118 as discussed with respect to FIG. 1. As shown in FIG. 10, in some embodiments, bitstream 1000 includes a header portion 1001 and a data portion 1002. In an embodiment, header portion 1001 includes a frame header 1011 and a slice header 1012. In an embodiment, both frame header 1011 and slice header 1012 are implemented via header portion 101. In an embodiment, frame header 1011 and slice header 1012 may be separated by a data portion.

In an embodiment, an indicator or indicators corresponding to FL CDEF combinations 114 (or a CDEF bypass indicator) are implemented or inserted in frame header 1011. Furthermore, header portion 1001 or data portion 1002 may include an indicator or indicators corresponding to SB level CDEF selections 116. Furthermore, data portion 1002 may include encoded picture data 1021 for coded pictures such that encoded picture data 1021 includes, for example, encoded quantized transform coefficients, motion vectors, intra-prediction indicators, etc. generated using filtered frame data generated using only FL CDEF combinations 114 as discussed herein.

Figure 11:
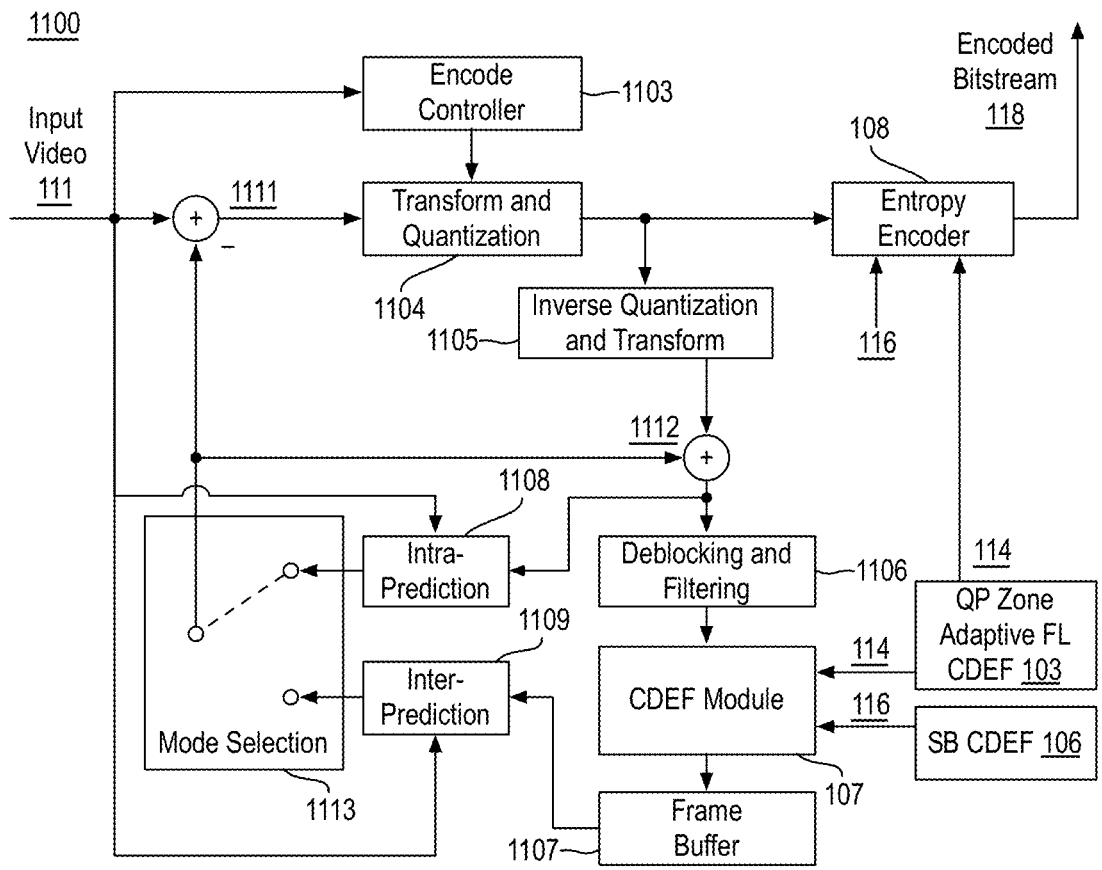
FIG. 11 illustrates a block diagram of an example encoder integrating selection of a subset of constrained directional enhancement filter combinations for a frame.

FIG. 11 illustrates a block diagram of an example encoder 1100 integrating selection of a subset of constrained directional enhancement filter combinations for a frame, arranged in accordance with at least some implementations of the present disclosure. As shown, encoder 1100 includes QP zone adaptive frame level CDEF combinations decision module 103, super block (SB) level CDEF selection module 106, an encode controller 1103, a transform and quantization module 1104, an inverse quantization and transform module 1105, a deblocking and filtering module 1106, a frame buffer 1107, an intra-prediction module 1108, an inter-prediction module 1109, a mode selection module 1113, and entropy encoder 108. Encoder 1100 may include additional modules such as other modules of system 100 and/or interconnections that are not shown for the sake of clarity of presentation.

As shown in FIG. 11, encoder 1100 may receive input video 111. Input video 111 may be in any suitable format and may be received via any suitable technique such as video capture or via memory or the like. Furthermore, input video 111 may be processed (not shown) to determine portions of video frames (e.g., super blocks, blocks, transform blocks, or any other portion of a video frame). As shown, input video 111 may be provided to encode controller 1103, intra-prediction module 1108, and inter-prediction module 1109. The coupling to intra-prediction module 1108 or inter-prediction module 1109 may be made via mode selection module 1113 as shown. For example, mode selection module 1113 may make final mode decisions for portions of video frames of input video 1101.

In some embodiments, as discussed with respect to FIG. 1, encoder 1100 may include video analysis module 101 and flat frame determination module 102 to determine whether a frame of input video 111 is flat and, if so, CDEF filtering is bypassed for the frame and an indicator of bypass is provided to entropy encoder 108 for inclusion in bitstream 118. Encoder 1100 may also include low QP analysis module 104 to determine whether a frame level QP for a frame of input video 111 is less than a threshold and, if so, CDEF filtering is bypassed for the frame and an indicator of bypass is provided to entropy encoder 108 for inclusion in bitstream 118. For other frame level QP values, QP zone adaptive frame level CDEF combinations decision module 103 determines frame level CDEF combinations 114 and provides them to CDEF filtering module 107 as discussed herein and to entropy encoder 108 for inclusion in bitstream 118. Furthermore, SB level CDEF selection module 106 determines one of frame level CDEF combinations 114 for each SB of a frame and provides them to CDEF filtering module 107 as discussed herein and to entropy encoder 108 for inclusion in bitstream 118.

As shown, mode selection module 1113 (e.g., via a switch), may select, for a SB or block or the like between a best intra-prediction mode and a best inter-prediction mode based on minimum coding cost or the like. Based on the mode selection, a predicted portion of the video frame may be differenced via differencer 1111 with the original portion of the video frame (e.g., of input video 111) to generate a residual. The residual may be transferred to transform and quantization module 1104, which may transform (e.g., via a discrete cosine transform or the like) the residual to determine transform coefficients and quantize the transform coefficients using the frame level QP discussed herein. The quantized transform coefficients may be encoded via entropy encoder 108 into encoded bitstream 118. Other data, such as motion vector residuals, modes data, transform size data, or the like may also be encoded and inserted into encoded bitstream 118 for the portion of the video frame.

Furthermore, the quantized transform coefficients may be inverse quantized and inverse transformed via inverse quantization and transform module 1105 to generate a reconstructed residual. The reconstructed residual may be combined with the aforementioned predicted portion at adder 1112 to form a reconstructed portion, which may be optionally deblocked and filtered via deblocking and filtering module 1106 to generate a reconstructed frame. The reconstructed frame is then CDEF filtered as discussed herein via CDEF filtering module 107 using the selected SB level CDEF selections 116 by filtering each block of an SB using the SB level CDEF selection for the SB along a detected direction of the block. The CDEF filtering generates a filtered frame, which is saved to frame buffer 1107 and used for encoding other portions of the current or other video frames. Such processing may be repeated for each video frame of input video 111.

Figure 12:
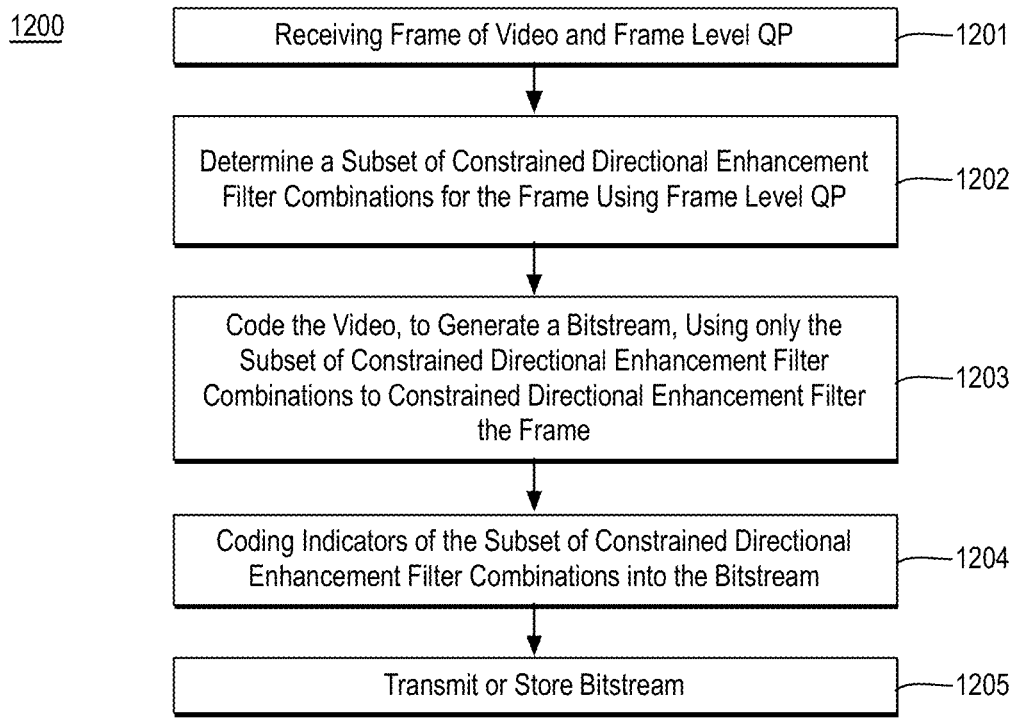
FIG. 12 is a flow diagram illustrating an example process for video coding including constrained direction enhancement filter selection.

FIG. 12 is a flow diagram illustrating an example process 1200 for video coding including constrained direction enhancement filter selection, arranged in accordance with at least some implementations of the present disclosure. Process 1200 may include one or more operations 1201-1205 as illustrated in FIG. 12. Process 1200 may form at least part of a video coding process. By way of non-limiting example, process 1200 may form at least part of a video coding process as performed by any device or system as discussed herein such as system 100 or encoder 1100. Furthermore, process 1200 will be described herein with reference to system 1300 of FIG. 13.

Figure 13:
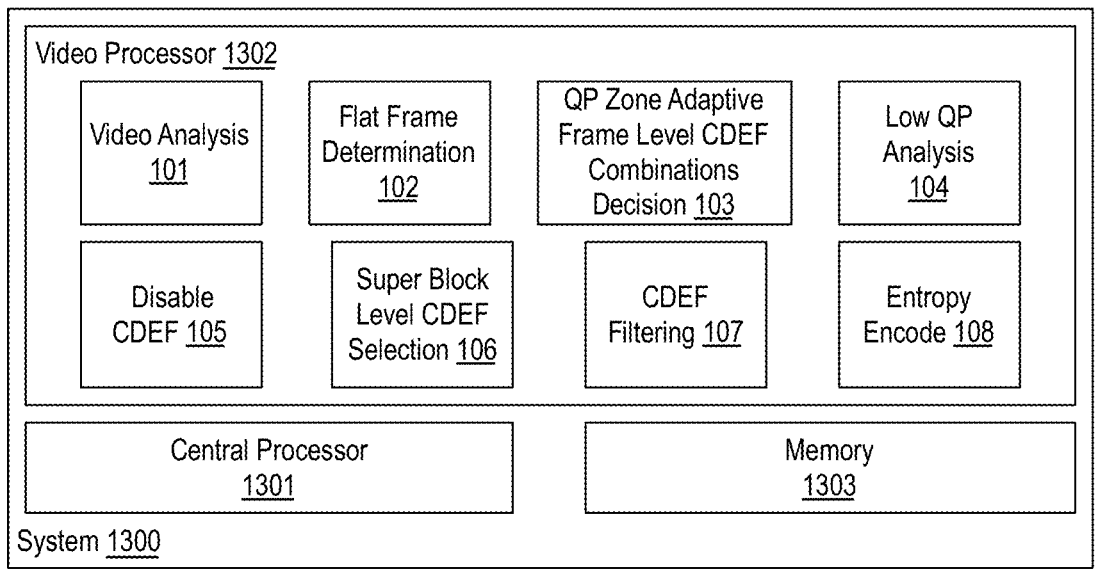
FIG. 13 is an illustrative diagram of an example system for video coding including constrained direction enhancement filter selection.

FIG. 13 is an illustrative diagram of an example system 1300 for video coding including constrained direction enhancement filter selection, arranged in accordance with at least some implementations of the present disclosure. As shown in FIG. 13, system 1300 may include a central processor 1301, a video processor 1302, and a memory 1303. Also as shown, video processor 1302 may include or implement video analysis module 101, flat frame determination module 102, QP zone adaptive frame level CDEF combinations decision module 103, low QP analysis module 104, disable CDEF module 105, super block level CDEF selection module 106, CDEF filtering module 107, and entropy encode module 108. In an embodiment, memory 1303 implements frame buffer 1107. Furthermore, in the example of system 1300, memory 1303 may store video data or related content such as frame data, SB data, block data, quantization parameters, filter strength parameters or thresholds, frame type data, bitstream data, and/or any other data as discussed herein.

As shown, in some embodiments, video analysis module 101, flat frame determination module 102, QP zone adaptive frame level CDEF combinations decision module 103, low QP analysis module 104, disable CDEF module 105, super block level CDEF selection module 106, CDEF filtering module 107, and entropy encode module 108 are implemented via video processor 1302. In other embodiments, one or more or portions of video analysis module 101, flat frame determination module 102, QP zone adaptive frame level CDEF combinations decision module 103, low QP analysis module 104, disable CDEF module 105, super block level CDEF selection module 106, CDEF filtering module 107, and entropy encode module 108 are implemented via central processor 1301 or another processing unit such as an image processor, a graphics processor, or the like.

Video processor 1302 may include any number and type of video, image, or graphics processing units that may provide the operations as discussed herein. Such operations may be implemented via software or hardware or a combination thereof. For example, video processor 1302 may include circuitry dedicated to manipulate pictures, picture data, or the like obtained from memory 1303. Central processor 1301 may include any number and type of processing units or modules that may provide control and other high level functions for system 1300 and/or provide any operations as discussed herein. Memory 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1303 may be implemented by cache memory.

In an embodiment, one or more or portions of video analysis module 101, flat frame determination module 102, QP zone adaptive frame level CDEF combinations decision module 103, low QP analysis module 104, disable CDEF module 105, super block level CDEF selection module 106, CDEF filtering module 107, and entropy encode module 108 are implemented via an execution unit (EU). The EU may include, for example, programmable logic or circuitry such as a logic core or cores that may provide a wide array of programmable logic functions. In an embodiment, one or more or portions of video analysis module 101, flat frame determination module 102, QP zone adaptive frame level CDEF combinations decision module 103, low QP analysis module 104, disable CDEF module 105, super block level CDEF selection module 106, CDEF filtering module 107, and entropy encode module 108 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 12, process 1200 may begin at operation 1201, where a frame of video for coding and a frame level quantization parameter corresponding to the frame are received.

Processing continues at operation 1202, where a subset of constrained directional enhancement filter combinations are determined for the frame received at operation 1201 based at least in part on the frame level quantization parameter such that the subset is from multiple available constrained directional enhancement filter combinations and such that each of the subset of constrained directional enhancement filter combinations indicates a deringing filter strength and a low-pass filter strength for the corresponding constrained directional enhancement filter combination. The deringing filter strength and a low-pass filter strength may be any suitable weights, parameters, or values to vary the filter strength of the corresponding filter component. In an embodiment, the deringing filter strength is a parameter to determine a maximum allowable difference between a pixel value of a pixel being filtered and a pixel value of a deringing filter tap of the constrained directional enhancement filter such that when the difference compares unfavorably with the maximum allowable difference, the pixel value of the filter tap is discarded and when the difference compares favorably with the maximum allowable difference, the pixel value is used in determining a filtered pixel value for the being filtered. In an embodiment, the low-pass filter strength is a parameter to determine another maximum allowable difference between the pixel value of the pixel being filtered and a pixel value of a low-pass filter tap of the constrained directional enhancement filter such that when the difference compares unfavorably with the maximum allowable difference, the pixel value of the low-pass filter tap is discarded and when the difference compares favorably with the maximum allowable difference, the pixel value is used in determining the filtered pixel value for the being filtered. In an embodiment, the pixel is a pixel of a block of pixels, the pixel value of the deringing filter tap is aligned with a detected direction of the block, and the pixel value of a low-pass filter tap is misaligned with the detected direction of the block.

In an embodiment, process 1200 further includes determining a number of constrained directional enhancement filter combinations for inclusion in the subset such that when the frame level quantization parameter compares favorably to a threshold, the number of constrained directional enhancement filter combinations is a first value and when the frame level quantization parameter does not compare favorably to the threshold, the number of constrained directional enhancement filter combinations is a second value less than the first value. For example, for higher frame level quantization parameters, fewer constrained directional enhancement filter combinations may be used for a frame and for lower frame level quantization parameters, more constrained directional enhancement filter combinations may be used for a frame.

In an embodiment, process 1200 further includes receiving a second frame of video for coding and a second frame level quantization parameter corresponding to the second frame such that the second frame level quantization parameter is less than the first frame level quantization parameter and determining a second subset of constrained directional enhancement filter combinations for the second frame based at least in part on the second frame level quantization parameter such that the subset and the second subset have the same number of directional enhancement filter combinations and, in response to the second frame level quantization parameter being less than the first frame level quantization parameter, the second subset includes only constrained directional enhancement filter combinations having lower filter strengths than a strongest constrained directional enhancement filter combination of the subset. For example, for higher frame level quantization parameters a set of stronger filters may be used and for lower frame level quantization parameters, a set of stronger filters may be used. In an embodiment, the strongest constrained directional enhancement filter combination of the subset and a first constrained directional enhancement filter combination of the second subset differ and remaining constrained directional enhancement filter combinations of the subset and remaining constrained directional enhancement filter combinations of the second subset are the same. In an embodiment, every constrained directional enhancement filter of the second subset is weaker than every constrained directional enhancement filter of the subset.

In an embodiment, process 1200 further includes receiving a second frame of video for coding and a second frame level quantization parameter corresponding to the second frame such that the second frame level quantization parameter is less than the first frame level quantization parameter and determining a second subset of constrained directional enhancement filter combinations for the second frame based at least in part on the second frame level quantization parameter such that, in response to the second frame level quantization parameter being less than the first frame level quantization parameter, the second subset has more constrained directional enhancement filter combinations than the subset, both the subset and the second subset have a matching constrained directional enhancement filter combination and all other constrained directional enhancement filter combinations of the subset are stronger than each remaining constrained directional enhancement filter combination of the second subset.

In an embodiment, process 1200 further includes determining the frame is not flat and a second frame of the video is flat based on flatness checks of the frame and the second frame and bypassing determining a second subset of constrained directional enhancement filter combinations for the second frame responsive to the frame being flat such that the determining the subset of constrained directional enhancement filter combinations for the frame discussed with respect to operation 1202 is responsive to the frame being not flat. In an embodiment, process 1200 further includes receiving a second frame of video for coding and a second frame level quantization parameter corresponding to the second frame and bypassing determining a second subset of constrained directional enhancement filter combinations for the second frame responsive to the second frame level quantization parameter not exceeding a threshold such that the determining the subset of constrained directional enhancement filter combinations for the frame discussed with respect to operation 1202 is responsive to the frame level quantization parameter exceeding the threshold.

In an embodiment, process 1200 further includes receiving second, third, fourth, and fifth frames having corresponding second, third, fourth, and fifth frame level quantization parameters, respectively, such that the second frame is a flat frame, bypassing determining a second subset of constrained directional enhancement filter combinations for the second frame responsive to the frame being flat, bypassing determining a third subset of constrained directional enhancement filter combinations for the third frame responsive to the third frame level quantization parameter being less than a first threshold, and determining a number of constrained directional enhancement filter combinations for inclusion in the subset, a fourth subset for the fourth frame, and a fifth subset for the fifth frame such that the number for inclusion in the subset is greater than the number for inclusion in the fourth subset and the number for inclusion in the fourth subset is greater than the number for inclusion in the firth subset responsive to the frame level quantization parameter being between the first threshold and a second threshold, the fourth frame level quantization parameter being between the second threshold and a third threshold, and the fifth frame level quantization parameter exceeding the third threshold, wherein the second threshold is greater than the first threshold, and the third threshold is greater than the second threshold.

In an embodiment, process 1200 further includes determining, for a super block of the frame, the super block including a plurality of blocks, a first constrained directional enhancement filter combination from only the subset of constrained directional enhancement filter combinations to constrained directional enhancement filter the frame and filtering each block of the super block using only the first constrained directional enhancement filter combination. In an embodiment, determining the first constrained directional enhancement filter combination includes testing each of the subset of constrained directional enhancement filter combinations for the super block and selecting a constrained directional enhancement filter combination having a smallest distortion cost as the first constrained directional enhancement filter combination for the super block and such that filtering each block of the super block comprises determining a direction corresponding to the block and applying the first constrained directional enhancement filter combination relative to the detected direction.

Processing continues at operation 1203, where the video is coded, to generate a bitstream, based at least in part on using only the subset of constrained directional enhancement filter combinations to constrained directional enhancement filter the frame. Notably, unselected constrained directional enhancement filter combinations are not used to constrained directional enhancement filter the frame. Processing continues at operation 1204, where one or more indicators of the subset of constrained directional enhancement filter combinations for the frame are coded into the bitstream. The indicator or indicators may be any suitable indicators and the bitstream may be any suitable bitstream such as AV1 compliant bitstream, etc. Processing continues at operation 1205, where the bitstream is transmitted and/or stored. The bitstream may be transmitted and/or stored using any suitable technique or techniques. In an embodiment, the bitstream is stored in a local memory such as memory 1303. In an embodiment, the bitstream is transmitted for storage at a hosting device such as a server. In an embodiment, the bitstream is transmitted by system 1300 or a server for use by a decoder device.

Process 1200 may be repeated any number of times either in series or in parallel for any number frames or video segments the like. As discussed, process 1200 may provide for video encoding including constrained direction enhancement filter selection.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
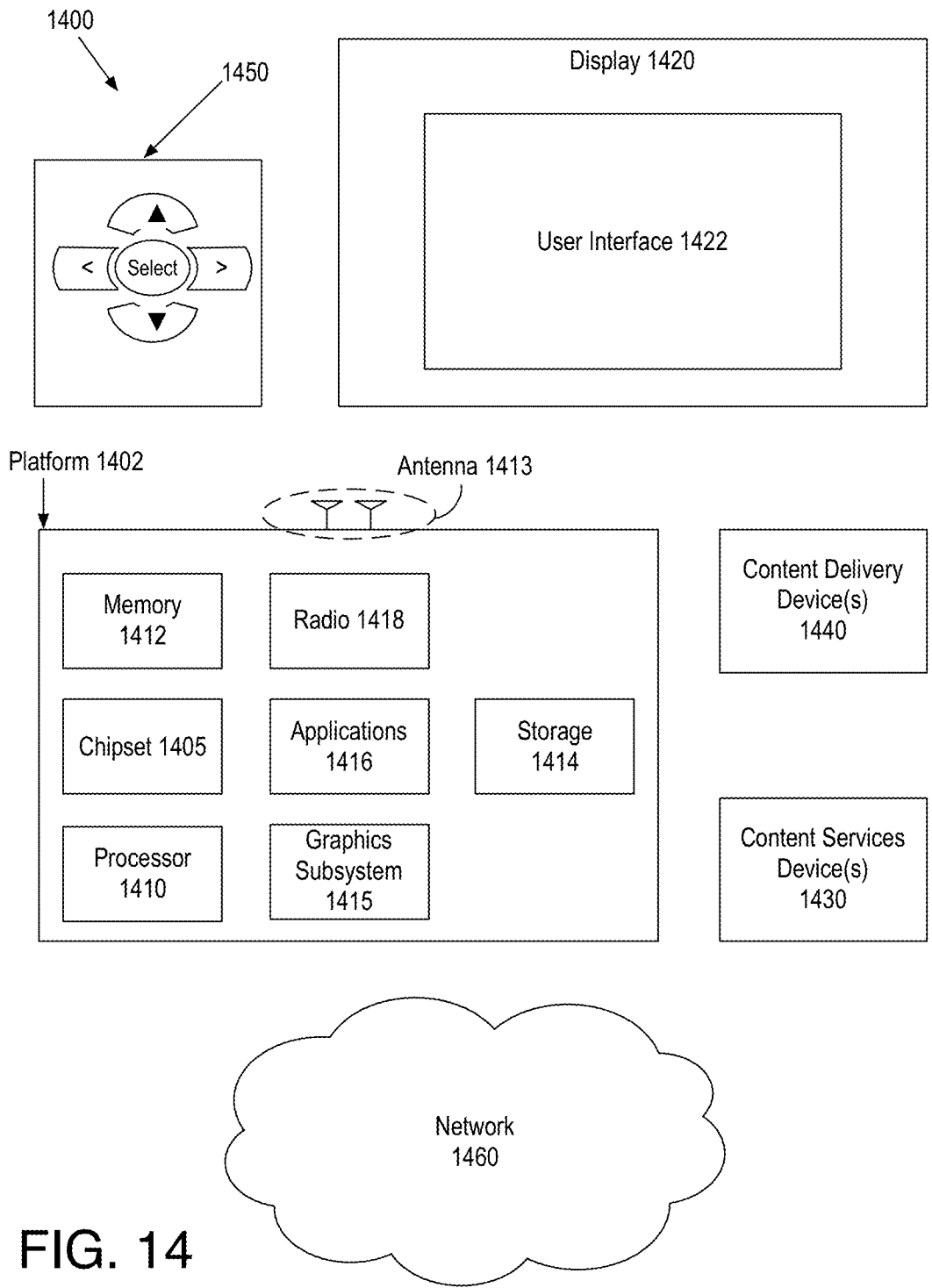
FIG. 14 is an illustrative diagram of an example system.

FIG. 14 is an illustrative diagram of an example system 1400, arranged in accordance with at least some implementations of the present disclosure. In various implementations, system 1400 may be a mobile system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, antenna 1413, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of may be used to interact with user interface 1422, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1420) by movements of a pointer, cursor, focus ring, or other visual indicators displayed on the display. For example, under the control of software applications 1416, the navigation features located on navigation may be mapped to virtual navigation features displayed on user interface 1422, for example. In various embodiments, may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
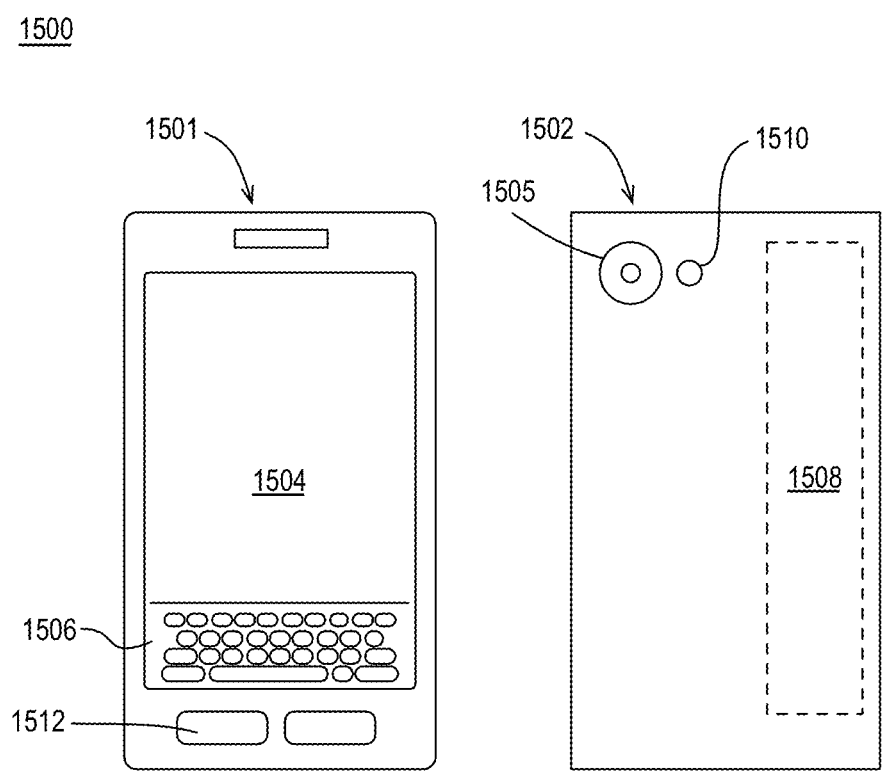
FIG. 15 illustrates an example device, all arranged in accordance with at least some implementations of the present disclosure.

As described above, system 1400 may be embodied in varying physical styles or form factors. FIG. 15 illustrates an example small form factor device 1500, arranged in accordance with at least some implementations of the present disclosure. In some examples, system 1400 may be implemented via device 1500. In other examples, system 100 or portions thereof may be implemented via device 1500. In various embodiments, for example, device 1500 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500. In other examples, camera 1505 and flash 1510 may be integrated into front 1501 of device 1500 or both front and back cameras may be provided. Camera 1505 and flash 1510 may be components of a camera module to originate image data processed into streaming video that is output to display 1504 and/or communicated remotely from device 1500 via antenna 1508 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A video coding system comprising:
   a memory to store first and second frames of video for coding and a frame level quantization parameter corresponding to the first frame; and
   a processor coupled to the memory, the processor to:
   determine the first frame is not flat and the second frame is flat based on flatness checks of the first and second frames;
   determine, responsive to the first frame being not flat, a first subset of constrained directional enhancement filter combinations for the first frame based at least in part on the first frame level quantization parameter, wherein the first subset is from a plurality of available constrained directional enhancement filter combinations and wherein each of the first subset of constrained directional enhancement filter combinations indicates a deringing filter strength and a low-pass filter strength for the corresponding constrained directional enhancement filter combination;
   bypass determination of a second subset of constrained directional enhancement filter combinations for the second frame responsive to the frame being flat;
   code the video, to generate a bitstream, based at least in part on using only the first subset of constrained directional enhancement filter combinations to constrained directional enhancement filter the first frame; and
   code one or more indicators of the first subset of constrained directional enhancement filter combinations for the first frame into the bitstream.

2. The video coding system of claim 1, wherein the deringing filter strength comprises a parameter to determine a maximum allowable difference between a pixel value of a pixel being filtered and a pixel value of a filter tap of the constrained directional enhancement filter, wherein when the difference compares unfavorably with the maximum allowable difference, the pixel value of the filter tap is discarded and when the difference compares favorably with the maximum allowable difference, the pixel value is used in determination of a filtered pixel value for the being filtered.

3. The video coding system of claim 2, wherein the low-pass filter strength comprises a parameter to determine a second maximum allowable difference between the pixel value of the pixel being filtered and a second pixel value of a second filter tap of the constrained directional enhancement filter, wherein when the difference compares unfavorably with the second maximum allowable difference, the second pixel value of the second filter tap is discarded and when the difference compares favorably with the maximum allowable difference, the second pixel value is used in determining the filtered pixel value for the being filtered, wherein the pixel comprises a pixel of a block of pixels, the pixel value of the filter tap is aligned with a detected direction of the block, and the second pixel value of a second filter tap is misaligned with the detected direction of the block.

4. The video coding system of claim 1, wherein the processor is further to:
   determine a number of constrained directional enhancement filter combinations for inclusion in the first subset, wherein when the first frame level quantization parameter compares favorably to a threshold, the number of constrained directional enhancement filter combinations is a first value and when the frame level quantization parameter does not compare favorably to the threshold, the number of constrained directional enhancement filter combinations is a second value less than the first value.

5. The video coding system of claim 1, wherein the processor is further to:
   receive a third frame of video for coding and a second frame level quantization parameter corresponding to the third frame, wherein the second frame level quantization parameter is less than the frame level quantization parameter; and
   determine a third subset of constrained directional enhancement filter combinations for the third frame based at least in part on the second frame level quantization parameter, wherein the first subset and the third subset have the same number of directional enhancement filter combinations, and wherein, in response to the second frame level quantization parameter being less than the frame level quantization parameter, the third subset includes only constrained directional enhancement filter combinations having lower filter strengths than a strongest constrained directional enhancement filter combination of the first subset.

6. The video coding system of claim 5, wherein the strongest constrained directional enhancement filter combination of the subset and a first constrained directional enhancement filter combination of the third subset differ and remaining constrained directional enhancement filter combinations of the subset and remaining constrained directional enhancement filter combinations of the third subset are the same.

7. The video coding system of claim 1, wherein the processor is further to:
   receive a third frame of video for coding and a second frame level quantization parameter corresponding to the third frame, wherein the second frame level quantization parameter is less than the frame level quantization parameter; and
   determine a third subset of constrained directional enhancement filter combinations for the third frame based at least in part on the second frame level quantization parameter, wherein in response to the second frame level quantization parameter being less than the frame level quantization parameter, the third subset has more constrained directional enhancement filter combinations than the first subset, both the first subset and the third subset have a matching constrained directional enhancement filter combination and all other constrained directional enhancement filter combinations of the first subset are stronger than each remaining constrained directional enhancement filter combination of the third subset.

8. The video coding system of claim 1, wherein the processor is further to:
   determine, for a super block of the first frame, the super block comprising a plurality of blocks, a first constrained directional enhancement filter combination from only the first subset of constrained directional enhancement filter combinations to constrained directional enhancement filter the frame; and
   filter each block of the super block using only the first constrained directional enhancement filter combination.

9. The video coding system of claim 8, wherein the processor to determine the first constrained directional enhancement filter combination comprises the processor to test each of the subset of constrained directional enhancement filter combinations for the super block and select a constrained directional enhancement filter combination having a smallest distortion cost as the first constrained directional enhancement filter combination for the super block and wherein the processor to filter each block of the super block comprises the processor to determine a direction corresponding to the block and apply the first constrained directional enhancement filter combination relative to the detected direction.

10. At least one non-transitory machine readable medium comprising a plurality of instructions that, in response to being executed on a computing device, cause the computing device to perform video coding by:
    receiving first and second frames of video for coding and a frame level quantization parameter corresponding to the first frame;
    determining the first frame is not flat and the second frame is flat based on flatness checks of the first and second frames;
    determining, responsive to the first frame being not flat, a first subset of constrained directional enhancement filter combinations for the first frame based at least in part on the first frame level quantization parameter, wherein the first subset is from a plurality of available constrained directional enhancement filter combinations and wherein each of the first subset of constrained directional enhancement filter combinations indicates a deringing filter strength and a low-pass filter strength for the corresponding constrained directional enhancement filter combination;
    bypassing determination of a second subset of constrained directional enhancement filter combinations for the second frame responsive to the frame being flat;
    coding the video, to generate a bitstream, based at least in part on using only the first subset of constrained directional enhancement filter combinations to constrained directional enhancement filter the first frame; and
    coding one or more indicators of the first subset of constrained directional enhancement filter combinations for the frame into the bitstream.

11. The non-transitory machine readable medium of claim 10, wherein the deringing filter strength comprises a parameter to determine a maximum allowable difference between a pixel value of a pixel being filtered and a pixel value of a filter tap of the constrained directional enhancement filter, wherein when the difference compares unfavorably with the maximum allowable difference, the pixel value of the filter tap is discarded and when the difference compares favorably with the maximum allowable difference, the pixel value is used in determination of a filtered pixel value for the being filtered.

12. The non-transitory machine readable medium of claim 10, further comprising a plurality of instructions that, in response to being executed on the computing device, cause the computing device to perform video coding by:
  determining a number of constrained directional enhancement filter combinations for inclusion in the first subset, wherein when the frame level quantization parameter compares favorably to a threshold, the number of constrained directional enhancement filter combinations is a first value and when the frame level quantization parameter does not compare favorably to the threshold, the number of constrained directional enhancement filter combinations is a second value less than the first value.

13. The non-transitory machine readable medium of claim 10, further comprising a plurality of instructions that, in response to being executed on the computing device, cause the computing device to perform video coding by:
  receiving a third frame of video for coding and a second frame level quantization parameter corresponding to the third frame, wherein the second frame level quantization parameter is less than the frame level quantization parameter; and
  determining a third subset of constrained directional enhancement filter combinations for the third frame based at least in part on the second frame level quantization parameter, wherein the first subset and the third subset have the same number of directional enhancement filter combinations, and wherein, in response to the second frame level quantization parameter being less than the frame level quantization parameter, the third subset includes only constrained directional enhancement filter combinations having lower filter strengths than a strongest constrained directional enhancement filter combination of the first subset.

14. The non-transitory machine readable medium of claim 10, further comprising a plurality of instructions that, in response to being executed on the computing device, cause the computing device to perform video coding by:
  receiving a third frame of video for coding and a second frame level quantization parameter corresponding to the third frame, wherein the second frame level quantization parameter is less than the frame level quantization parameter; and
  determining a third subset of constrained directional enhancement filter combinations for the third frame based at least in part on the second frame level quantization parameter, wherein in response to the second frame level quantization parameter being less than the frame level quantization parameter, the subset has more constrained directional enhancement filter combinations than the first subset, both the first subset and the third subset have a matching constrained directional enhancement filter combination and all other constrained directional enhancement filter combinations of the first subset are stronger than each remaining constrained directional enhancement filter combination of the third subset.

15. A video coding system comprising:
  a memory to store first and second frames of video for coding and first and second frame level quantization parameters corresponding to the first and second frames, respectively; and
  a processor coupled to the memory, the processor to:
    determine, responsive to the first frame level quantization parameter not exceeding a threshold, a first subset of constrained directional enhancement filter combinations for the first frame based at least in part on the first frame level quantization parameter, wherein the first subset is from a plurality of available constrained directional enhancement filter combinations and wherein each of the first subset of constrained directional enhancement filter combinations indicates a deringing filter strength and a low-pass filter strength for the corresponding constrained directional enhancement filter combination;
    bypass determination of a second subset of constrained directional enhancement filter combinations for the second frame responsive to the second frame level quantization parameter exceeding the threshold;
    code the video, to generate a bitstream, based at least in part on using only the first subset of constrained directional enhancement filter combinations to constrained directional enhancement filter the first frame; and
    code one or more indicators of the first subset of constrained directional enhancement filter combinations for the first frame into the bitstream.

16. The video coding system of claim 15, wherein the deringing filter strength comprises a parameter to determine a maximum allowable difference between a pixel value of a pixel being filtered and a pixel value of a filter tap of the constrained directional enhancement filter, wherein when the difference compares unfavorably with the maximum allowable difference, the pixel value of the filter tap is discarded and when the difference compares favorably with the maximum allowable difference, the pixel value is used in determination of a filtered pixel value for the being filtered.

17. The video coding system of claim 15, wherein the processor is further to:
  determine a number of constrained directional enhancement filter combinations for inclusion in the first subset, wherein when the first frame level quantization parameter compares favorably to a second threshold, the number of constrained directional enhancement filter combinations is a first value and when the first frame level quantization parameter does not compare favorably to the second threshold, the number of constrained directional enhancement filter combinations is a second value less than the first value.

18. The video coding system of claim 15, wherein the processor is further to:
  receive a third frame of video for coding and a third frame level quantization parameter corresponding to the third frame, wherein the third frame level quantization parameter is less than the first frame level quantization parameter; and
  determine a third subset of constrained directional enhancement filter combinations for the third frame based at least in part on the third frame level quantization parameter, wherein the first subset and the third subset have the same number of directional enhancement filter combinations, and wherein, in response to the third frame level quantization parameter being less than the first frame level quantization parameter, the third subset includes only constrained directional enhancement filter combinations having lower filter strengths than a strongest constrained directional enhancement filter combination of the first subset.

19. The video coding system of claim 15, wherein the processor is further to:
  receive a third frame of video for coding and a third frame level quantization parameter corresponding to the third frame, wherein the third frame level quantization parameter is less than the first frame level quantization parameter; and determine a third subset of constrained directional enhancement filter combinations for the third frame based at least in part on the third frame level quantization parameter, wherein in response to the third frame level quantization parameter being less than the first frame level quantization parameter, the third subset has more constrained directional enhancement filter combinations than the first subset, both the first subset and the second subset have a matching constrained directional enhancement filter combination and all other constrained directional enhancement filter combinations of the first subset are stronger than each remaining constrained directional enhancement filter combination of the third subset.

20. The video coding system of claim 15, wherein the processor is further to:

determine, for a super block of the first frame, the super block comprising a plurality of blocks, a first constrained directional enhancement filter combination from only the first subset of constrained directional enhancement filter combinations to constrained directional enhancement filter the frame; and filter each block of the super block using only the first constrained directional enhancement filter combination.

21. At least one non-transitory machine readable medium comprising a plurality of instructions that, in response to being executed on a computing device, cause the computing device to perform video coding by:

receiving first and second frames of video for coding and first and second frame level quantization parameters corresponding to the first and second frames, respectively;

determining, responsive to the first frame level quantization parameter not exceeding a threshold, a first subset of constrained directional enhancement filter combinations for the first frame based at least in part on the first frame level quantization parameter, wherein the first subset is from a plurality of available constrained directional enhancement filter combinations and wherein each of the first subset of constrained directional enhancement filter combinations indicates a deringing filter strength and a low-pass filter strength for the corresponding constrained directional enhancement filter combination;

bypassing determination of a second subset of constrained directional enhancement filter combinations for the second frame responsive to the second frame level quantization parameter exceeding the threshold;

coding the video, to generate a bitstream, based at least in part on using only the first subset of constrained directional enhancement filter combinations to constrained directional enhancement filter the first frame; and code one or more indicators of the first subset of constrained directional enhancement filter combinations for the first frame into the bitstream.

22. The non-transitory machine readable medium of claim 21, wherein the deringing filter strength comprises a parameter to determine a maximum allowable difference between a pixel value of a pixel being filtered and a pixel value of a filter tap of the constrained directional enhancement filter, wherein when the difference compares unfavorably with the maximum allowable difference, the pixel value of the filter tap is discarded and when the difference compares favorably with the maximum allowable difference, the pixel value is used in determination of a filtered pixel value for the being filtered.

23. The non-transitory machine readable medium of claim 21, further comprising a plurality of instructions that, in response to being executed on the computing device, cause the computing device to perform video coding by:

determining a number of constrained directional enhancement filter combinations for inclusion in the first subset, wherein when the first frame level quantization parameter compares favorably to a second threshold, the number of constrained directional enhancement filter combinations is a first value and when the first frame level quantization parameter does not compare favorably to the second threshold, the number of constrained directional enhancement filter combinations is a second value less than the first value.

24. The non-transitory machine readable medium of claim 21, further comprising a plurality of instructions that, in response to being executed on the computing device, cause the computing device to perform video coding by:

receiving a third frame of video for coding and a third frame level quantization parameter corresponding to the third frame, wherein the third frame level quantization parameter is less than the first frame level quantization parameter; and determining a third subset of constrained directional enhancement filter combinations for the third frame based at least in part on the third frame level quantization parameter, wherein the first subset and the third subset have the same number of directional enhancement filter combinations, and wherein, in response to the third frame level quantization parameter being less than the first frame level quantization parameter, the third subset includes only constrained directional enhancement filter combinations having lower filter strengths than a strongest constrained directional enhancement filter combination of the first subset.

25. The non-transitory machine readable medium of claim 21, further comprising a plurality of instructions that, in response to being executed on the computing device, cause the computing device to perform video coding by:

receiving a third frame of video for coding and a third frame level quantization parameter corresponding to the third frame, wherein the third frame level quantization parameter is less than the first frame level quantization parameter; and determining a third subset of constrained directional enhancement filter combinations for the third frame based at least in part on the third frame level quantization parameter, wherein in response to the third frame level quantization parameter being less than the first frame level quantization parameter, the third subset has more constrained directional enhancement filter combinations than the first subset, both the first subset and the second subset have a matching constrained directional enhancement filter combination and all other constrained directional enhancement filter combinations of the first subset are stronger than each remaining constrained directional enhancement filter combination of the third subset.

* * * * *